(12) United States Patent
Kanno et al.

(10) Patent No.: US 9,921,049 B2
(45) Date of Patent: Mar. 20, 2018

(54) THREE-DIMENSIONAL COORDINATE MEASUREMENT APPARATUS

(71) Applicant: Tokyo Seimitsu Co., Ltd., Tokyo (JP)

(72) Inventors: Yukio Kanno, Tsuchiura (JP);
Keiichiro Gomi, Tsuchiura (JP);
Takashi Fujita, Hachioji (JP)

(73) Assignee: Tokyo Seimitsu Co., Ltd., Tokyo (JP)

(*) Notice: Subject to any disclaimer, the term of this patent is extended or adjusted under 35 U.S.C. 154(b) by 0 days.

(21) Appl. No.: 15/662,223

(22) Filed: Jul. 27, 2017

(65) Prior Publication Data

US 2017/0322016 A1 Nov. 9, 2017

Related U.S. Application Data

(63) Continuation of application No. PCT/JP2016/052776, filed on Jan. 29, 2016.

(30) Foreign Application Priority Data

Jan. 30, 2015 (JP) .................. 2015-016240
Jan. 30, 2015 (JP) .................. 2015-016241
(Continued)

(51) Int. Cl.
*G01B 11/03* (2006.01)
*G01B 11/00* (2006.01)
*G01D 5/347* (2006.01)

(52) U.S. Cl.
CPC ....... *G01B 11/005* (2013.01); *G01D 5/34746* (2013.01)

(58) Field of Classification Search
CPC ............. G01B 11/005; G01D 5/34746
(Continued)

(56) References Cited

U.S. PATENT DOCUMENTS 3,749,501 A    7/1973   Wieg
3,840,993 A * 10/1974   Shelton .................. G01B 5/008
                                                  188/176
(Continued)

FOREIGN PATENT DOCUMENTS

JP    56-105803 U1   8/1981
JP    58-028442 A    2/1983
(Continued)

OTHER PUBLICATIONS

Tokyo-Seimitsu Co., Ltd., Notification of Reasons for Rejection, JP2016-015851, dated Jul. 19, 2017, 7 pgs.
(Continued)

*Primary Examiner* — Christopher Fulton
(74) *Attorney, Agent, or Firm* — Morgan, Lewis & Bockius LLP

(57) ABSTRACT

There is provided a three-dimensional coordinate measurement apparatus capable of reducing shaking of a Y carriage and improving measurement accuracy. A groove is formed along a Y-axis direction in a right side part of a surface plate made of stone, and a Y guide is formed between the groove and a right side surface of the surface plate to support a Y carriage in a portal shape in a movable manner in the Y-axis direction. A support section is provided at a lower end of a right Y carriage on the right side of the Y carriage, and the support section is supported by the surface plate through air pads which are disposed by two air pads back and forth on the corresponding one of a top surface, a right side surface, and a bottom surface, of the surface plate, and a right side surface of the groove.

3 Claims, 28 Drawing Sheets

(30) Foreign Application Priority Data

Jan. 30, 2015 (JP) ................................ 2015-016242
Jan. 30, 2015 (JP) ................................ 2015-016243

(58) Field of Classification Search
USPC .................................................. 33/503, 1 M
See application file for complete search history.

(56) References Cited

U.S. PATENT DOCUMENTS

| | | | |
|---|---|---|---|
| 4,852,267 A | | 8/1989 | Tezuka |
| 4,939,678 A * | | 7/1990 | Beckwith, Jr. ....... G01B 11/005 33/1 M |
| 5,042,162 A * | | 8/1991 | Helms ................... F16F 7/1005 248/559 |
| 5,251,156 A * | | 10/1993 | Heier ................... G01B 11/005 33/503 |
| 5,333,386 A | | 8/1994 | Breyer et al. |
| 5,848,480 A * | | 12/1998 | Sola ..................... G01B 5/0004 33/503 |
| 6,333,696 B1 | | 12/2001 | Matsumiya et al. |
| 6,370,787 B1 * | | 4/2002 | Kikuchi ............... G01B 5/0011 33/1 M |
| 6,430,828 B1 * | | 8/2002 | Ulbrich ................ G01B 7/012 33/503 |
| 6,587,810 B1 * | | 7/2003 | Guth .................... G05B 19/401 33/503 |
| 6,854,193 B2 * | | 2/2005 | Lotze ................... G01B 11/005 33/502 |
| 7,222,434 B2 * | | 5/2007 | Kikuchi ............... F16C 29/001 33/1 M |
| 7,392,692 B2 * | | 7/2008 | Noda ................... G01B 5/008 33/503 |
| 7,698,829 B2 * | | 4/2010 | Lutz ..................... B23Q 1/0054 33/1 M |
| 9,664,629 B2 * | | 5/2017 | Sakai ................... G01N 25/16 |

FOREIGN PATENT DOCUMENTS

| | | |
|---|---|---|
| JP | 59-105502 A | 6/1984 |
| JP | 61-131612 U | 8/1986 |
| JP | 62-161938 U1 | 10/1987 |
| JP | 62-235502 A | 10/1987 |
| JP | 62-235514 A | 10/1987 |
| JP | S62235513 A | 10/1987 |
| JP | 01-035310 A | 2/1989 |
| JP | 05-157503 A | 6/1993 |
| JP | 05-240635 A | 9/1993 |
| JP | 05-312556 A | 11/1993 |
| JP | 0637710 U | 5/1994 |
| JP | 07-139936 A | 6/1995 |
| JP | 07-167641 A | 7/1995 |
| JP | H07-218247 A | 8/1995 |
| JP | H08-014808 A | 1/1996 |
| JP | 09-145342 A | 6/1997 |
| JP | 10-026203 A | 1/1998 |
| JP | 11-190339 A | 7/1999 |
| JP | 2001-147115 A | 5/2001 |
| JP | 2006-287098 A | 10/2006 |
| JP | 2007-033052 A | 2/2007 |
| JP | 61-19914 B2 | 4/2017 |

OTHER PUBLICATIONS

Fujifilm, Decision of Rejection, JP2016-015851, dated Sep. 13, 2017, 5 pgs.
Tokyo-Seimitsu Co., Ltd., Notification of Reasons for Rejection, JP2017-128896, dated Aug. 1, 2017, 6 pgs.
Tokyo-Seimitsu Co., Ltd., Decision of Rejection, JP2016-015851, dated Sep. 13, 2017, 5 pgs.
Tokyo Seimitsu Co., Ltd., International Search Report and Written Opinion, PCT/JP2016/052776, dated Apr. 26, 2016, 9 pgs.
Tokyo Seimitsu Co., Ltd., International Preliminary Report on Patentability, PCT/JP2016/052776, dated Dec. 21, 2016, 5 pgs.
Tokyo-Seimitsu Co., Ltd., Notification of Reasons for Rejection, JP2017-068525, dated Apr. 28, 2017, 6 pgs.
Tokyo-Seimitsu Co., Ltd., Decision to Grant, JP2017-068525, dated Jun. 13, 2017, 5 pgs.
Tokyo-Seimitsu Co., Ltd., Notification of Reasons for Rejection, JP2016-246967, dated Jan. 10, 2017, 7 pgs.
Tokyo-Seimitsu Co., Ltd., Decision of Rejection, JP2016-531719, dated Sep. 26, 2016, 5 pgs.
Tokyo-Seimitsu Co., Ltd., Notification of Reasons for Rejection, JP2016-531719, dated Jun. 27, 2016, 6 pgs.
Tokyo Seimitsu Co., Ltd., Translation of International Preliminary Report on Patentability, PCT/JP2016/052776, dated Aug. 3, 2017, 9 pgs.
Tokyo-Seimitsu Co., Ltd., Extended European Search Report, EP16743570.0, Nov. 7, 2017, 8 pgs.
Tokyo-Seimitsu Co., Ltd., Notification of Reasons for Rejection, JP2017-193423, Oct. 30, 2017, 6 pgs.
Tokyo-Seimitsu Co., Ltd., Notification of Reasons for Rejection, JP2016015850, Nov. 13, 2017, 7 pgs.
Tokyo-Seimitsu Co., Ltd., Notification of Reasons for Rejection, JP2016015852, Nov. 13, 2017, 7 pgs.
Tokyo-Seimitsu Co., Ltd., Decision of Rejection, JP2016-015850, Jan. 5, 2018, 8 pgs.

* cited by examiner

THREE-DIMENSIONAL COORDINATE MEASUREMENT APPARATUS

CROSS-REFERENCE TO RELATED APPLICATIONS

This application is a Continuation of PCT International Application No. PCT/JP2016/052776 filed on Jan. 29, 2016, which claims priorities under 35 U.S.C. § 119 to Japanese Patent Application No. 2015-016240 filed on Jan. 30, 2015, Japanese Patent Application No. 2015-016241 filed on Jan. 30, 2015, Japanese Patent Application No. 2015-016242 filed on Jan. 30, 2015 and Japanese Patent Application No. 2015-016243 filed on Jan. 30, 2015. Each of the above applications is hereby expressly incorporated by reference, in their entirety, into the present application.

BACKGROUND OF THE INVENTION

1. Field of the Invention

The present invention relates to a three-dimensional coordinate measurement apparatus, and more particularly to a three-dimensional coordinate measurement apparatus that measures a three-dimensional shape of a measuring object by moving a measuring probe in three axial directions of X, Y, and Z axes.

2. Description of the Related Art

In a typical three-dimensional coordinate measurement apparatus, a Y carriage movable in a fore-and-aft direction (Y-axis direction) is disposed above a surface plate on which a measuring object is placed. The Y carriage includes a columnar X guide spanning along a side-to-side direction (X-axis direction), and an X carriage is supported by the X guide to be movable in the X-axis direction. In the X carriage, a columnar Z carriage along a vertical direction (Z-axis direction) is supported to be movable in the Z-axis direction, and the Z carriage is provided at its lower end with a measuring probe. This allows a gauge head (stylus) of the measuring probe to be supported in a freely movable manner in three axial directions of X, Y, and Z axes (refer to PTLs 1 to 3, for example).

In this kind of three-dimensional coordinate measurement apparatus, PTL 1 discloses a support structure in which a Y carriage is supported by both left and right side surfaces of a surface plate, and a top surface of the surface plate, through air pads (air bearings).

CITATION LIST

Patent Literature

PTL 1: Japanese Patent Application Laid-Open No. 2007-33052
PTL 2: Japanese Patent Application Laid-Open No. 7-139936
PTL 3: Japanese Patent Application Laid-Open No. 7-167641

SUMMARY OF THE INVENTION

In a three-dimensional coordinate measurement apparatus that has been increased in speed and accuracy, the Y carriage needs to be improved in rigidity.

However, the Y carriage is supported by a structure in which the surface plate is held in its entire lateral width by three air pads of the Y carriage in PTL 1, and thus the structure is tolerant of shaking in the side-to-side direction, but is less tolerant of shaking in the fore-and-aft direction. Therefore, there is a problem in that shaking in a direction around the Z axis (yawing direction) is liable to occur.

In addition, since no air pad for reducing upward movement of the Y carriage is provided in PTL 1, shaking of the Y carriage in a direction around the X axis (pitching direction) may occur to deteriorate measurement accuracy. Occurrence of shaking of the Y carriage in the pitching direction may deteriorate shaking in the yawing direction.

The present invention is made in light of the above-mentioned circumstances, and it is a first object of the invention to provide a three-dimensional coordinate measurement apparatus capable of reducing shaking of a Y carriage and improving measurement accuracy.

In a three-dimensional measuring device such as described above, measurement of a position of each point of a measuring object in a Y-axis direction (Y coordinate value), or measurement of a Y coordinate value of a stylus of a measuring probe, is performed by measuring a position (Y coordinate value) of a Y carriage in the Y-axis direction. A linear encoder is used as position detection means for measuring a Y-axis coordinate value of the Y carriage. A scale (a member on which a scale is formed) in the linear encoder is provided at a part of a surface plate, near a driving unit provided in the Y carriage, in many cases, as described in PTL 2. In addition, when there is provided a Y guide that supports a Y carriage to be movable in a Y-axis direction, and that is a member separated from a surface plate, as described in PTL 3, a scale is sometimes provided in the Y guide.

However, when the scale is provided in the Y guide that is a member separated from the surface plate, it is difficult to persistently maintain high measurement accuracy in consideration of a difference between thermal deformation of the surface plate and that of the Y guide, and stability of a fastening part between the surface plate and the Y guide.

Even when the scale is provided on the surface plate, the scale is conventionally provided at a peripheral part of the surface plate, such as a side surface of the surface plate along a Y-axis direction. As a result, a strut part and so on erected along a Z-axis direction of a Y carriage are interposed between the scale and a measurement region where a measuring object is disposed, and a distance from the scale to the measurement region increases.

Meanwhile, the Y carriage (the X guide spanned right and left) is disposed along an X-axis direction, and if a direction of the X guide is deviated from the X-axis direction due to shaking in a yawing direction (a direction around a Z-axis) of the Y carriage, or the like, a difference between a Y coordinate value of a position at which a gauge head of a measuring probe is actually disposed in the measurement region, and a Y coordinate value of the gauge head acquired from a Y coordinate value of the Y carriage that is actually measured by the scale, increases as a distance from the measurement region to the scale increases.

Thus, if the distance from the measurement region to the scale is large like a conventional apparatus, shaking in a yawing direction of a Y carriage tends to cause deterioration in measurement accuracy of the Y coordinate value of the Y carriage, or in measurement accuracy the Y coordinate value of the measuring object.

When the scale is provided at a peripheral part of the surface plate, the scale tends to be affected by ambient temperature because the scale is close to outside air, and an error due to expansion and contraction of the scale itself also tends to occur.

The present invention is made in light of the above-mentioned circumstances, and it is a second object of the invention to provide a three-dimensional coordinate measurement apparatus improving measurement accuracy at a position in a Y-axis direction of a Y carriage, or measurement accuracy of a Y coordinate value of a measuring object.

Moreover, in the three-dimensional coordinate measurement apparatus as described above, PTL 1 discloses the support structure in which the Y carriage is supported by left and right side surfaces of the surface plate, and the top surface of the surface plate along the left and right side surfaces, through the air pads (air bearings).

As described in PTL 1, stone, such as granite and marble with high hardness and large specific gravity, is used as the surface plate to prevent deterioration in straightness of the surface of the surface plate due to deformation of the surface plate and to prevent deterioration in measurement accuracy due to vibration.

Meanwhile, a surface plate made of stone has low thermal conductivity, and thus heat tends to be difficult to transfer inside the surface plate. As a result, when temperature (ambient temperature) of outside air in the periphery of the surface plate changes, a temperature gradient exits for a long time until temperature inside of the surface plate becomes uniform. Occurrence of this kind of temperature gradient may cause a problem in that the surface plate is deformed to deteriorate straightness of surfaces (e.g., a top surface and a side surface) of the surface plate, thereby deteriorating measurement accuracy. In particular, because each of the right and left side surfaces of the surface plate is used as a guide of the Y carriage, deterioration in straightness of each of the right and left side surface causes an error in a support angle of the Y carriage and greatly affects a measurement result.

Then, PTL 1 discloses that surfaces which is not used as a guide of the Y carriage, that is, front and rear side surfaces of the surface plate, are covered with thermal insulation members. This reduces the amount of heat transferring to and from the front and rear side surfaces of the surface plate. Therefore, even if change in ambient temperature causes a temperature gradient inside the surface plate, occurrence of a temperature gradient in a Y-axis direction is reduced. Thus, regardless of change in ambient temperature, deterioration in straightness of each of the right and left side surfaces of the surface plate is reduced to reduce deterioration in measurement accuracy.

When the measurement region where the measuring object is placed and measured, and the guide region where the Y carriage is guided in the Y-axis direction, are integrally formed in a region of the surface plate as described in PTL 1, heat generated by a motor or the like of a Y driving mechanism which moves the Y carriage in the Y-axis direction transfers into the measurement region through the guide region.

Since the measurement region has a large volume and a large heat capacity (low thermal conductivity), it takes a long time until temperature of the surface plate becomes uniform when heat transfers into the measurement region.

Thus, even if the front and rear side surfaces of the surface plate are covered with the thermal insulation member to reduce occurrence of the temperature gradient in the Y-axis direction of the surface plate due to influence of peripheral air temperature as described in PTL 1, heat generated by the Y driving mechanism may cause a temperature gradient in the Y-axis direction. In this case, straightness of a surface of a guide part is deteriorated to cause deterioration in measurement accuracy.

The present invention is made in light of the above-mentioned circumstances, and it is a third object of the present invention to provide a three-dimensional coordinate measurement apparatus capable of performing measurement with high accuracy by reducing deformation of a surface plate due to heat.

A three-dimensional coordinate measurement apparatus for achieving the object of the present invention includes: a surface plate with a top surface and a bottom surface, and side surfaces, the surface place being configured to place a measuring object; and a Y carriage in a portal shape provided across the surface plate to support a measuring probe, the Y carriage being movable in a Y-axis direction of the surface plate and supported on the surface plate with two strut members, wherein the two strut members include a first strut member provided with a driving mechanism configured to drive the Y carriage in the Y-axis direction, and a second strut member configured to move following the first strut member, the surface plate includes a pair of side surfaces perpendicular to the top surface and the bottom surface of the surface plate on a first strut member side, the first strut member is supported by the surface plate with at least one of a vertical support member configured to hold (clamp, grip, or pinch) the surface plate in a vertical direction therebetween, and a side surface support member configured to hold (clamp, grip, or pinch) the pair of side surfaces therebetween, and the second strut member is supported by a top surface support member provided in the top surface of the surface plate.

According to this three-dimensional coordinate measurement apparatus, oscillation around a Z-axis can be suppressed when the Y carriage is moved along the Y-direction, whereby a yawing error can be suppressed. In addition, it is possible to reduce a pitching error and a rolling error which deteriorate the yawing error. As a result, shaking of the Y carriage can be suppressed.

In a three-dimensional coordinate measurement apparatus according to another aspect of the present invention, when one of the side surfaces of the surface plate on the first strut member side is indicated as a first side surface, a groove is formed along the Y-axis direction in the top surface of the surface plate on a side of the first side surface, and the first strut member is slidably disposed along the first side surface and inner surfaces of the groove, the inner surfaces of the groove includes a second side surface and a third side surface along the Y-axis direction, the second side surface and the third side surface facing each other, the second side surface being formed closer to the first side surface than the third side surface, and the two side surfaces are formed of the first side surface and the second side surface Constituting the two side surfaces by the groove formed in the surface plate enables measurement accuracy with reference to the surface plate.

In a three-dimensional coordinate measurement apparatus according to another aspect of the present invention, when the first strut member is supported by the surface plate by at least the side surface support member, the side surface support member includes: a first support member and a second support member that are slidably disposed in one of the two side surfaces, and are provided at two respective places along the Y-axis direction; and a third support member and a fourth support member that are slidably disposed in another one of the two side surfaces, and are provided at two respective places along the Y-axis direction, and the first and third support members are disposed at positions facing the second and fourth support members, respectively. This enables to suppress particularly oscillation around the Z-axis (yawing error) of the Y carriage.

In a three-dimensional coordinate measurement apparatus according to yet another aspect of the present invention, when the first strut member is supported by the surface plate with at least the vertical support member, the vertical support member includes: a fifth support member and a sixth support member that are slidably disposed in the top surface of the surface plate, and are provided at two respective places along the Y-axis direction; and a seventh support member and an eighth support member that are slidably disposed in the bottom surface of the surface plate, and are provided at two respective places along the Y-axis direction, and the fifth and seventh support members are disposed at positions facing the sixth and eighth support members, respectively. This enables to suppress particularly oscillation around the X-axis (pitching error) of the Y carriage.

In a three-dimensional coordinate measurement apparatus according to yet another aspect of the present invention, when the first strut member is supported by the surface plate with the side surface support member, the driving mechanism is brought into contact with one of the two side surfaces, at a position between the side surface support members at two respective places, and when the first strut member is supported by the surface plate by the vertical support member, the driving mechanism is brought into contact with another one of the two side surfaces at a position between the vertical support members at two respective places. This enables to absorb vibration applied to the Y carriage by the side surface support members provided at the two places along the Y-axis direction and the vertical support members. As a result, it is possible to reduce a yawing error, and a pitching error and a rolling error which cause increase of the yawing error.

In a three-dimensional coordinate measurement apparatus according to yet another aspect of the present invention, a distance between the two places in the Y-axis direction is larger than a distance between the two side surfaces. This enables to reduce vibration applied to the Y carriage.

In a three-dimensional coordinate measurement apparatus according to yet another aspect of the present invention, the driving mechanism includes a roller that is brought into contact with one of the two side surfaces, and a motor configured to rotate the roller.

In a three-dimensional coordinate measurement apparatus according to yet another aspect of the present invention, there is provided position detection means configured to detect a position of the Y carriage in the Y-axis direction by using a scale disposed at a position between the first strut member and the second strut member along the Y-axis direction in the surface plate. This enables to reduce a distance between the measurement region where a measuring object is disposed on the top surface of the surface plate, and the scale, whereby measurement accuracy can be improved.

In addition, even if there is a yawing error caused by movement of the Y carriage in the Y-axis direction, because the scale exists between the measurement region and the first strut member, the scale can be read at a part closer to the measurement region (that is, a part close to a workpiece). That is, the scale can be read at a position where the yawing error is lower than that on a driving side (the first strut member and the driving mechanism), whereby measurement accuracy can be improved.

In a three-dimensional coordinate measurement apparatus according to yet another aspect of the present invention, when one of the side surfaces of the surface plate on the first strut member side is indicated as a first side surface, a groove is formed along the Y-axis direction in the top surface of the surface plate on a side of the first side surface, and the first strut member is slidably disposed along the first side surface and inner surfaces of the groove, the inner surfaces of the groove includes a second side surface and a third side surface along the Y-axis direction, the second side surface and the third side surface facing each other, the second side surface being formed closer to the first side surface than the third side surface, and the scale is provided on the third side surface. This enables to reduce a distance between the measurement region where a measuring object is disposed on the top surface of the surface plate, and the scale. Since the scale is provided in the groove inside the surface plate, there is less influence of change in temperature of outside air, whereby deterioration in accuracy due to expansion and contraction of the scale is suppressed. As a result, measurement accuracy can be improved.

In addition, the scale is provided on the third side surface of the surface plate, that is, in a vertical surface perpendicular to the top surface of the surface plate. Accordingly, even if dirt or dust drops from above the surface plate, it is not attached on the scale, whereby there is no malfunction in scale reading due to dirt or dust.

In a three-dimensional coordinate measurement apparatus according to yet another aspect of the present invention, there is provided a covering member configured to cover an opening of the groove. This enables the inside of the groove to be shielded from outside air, and thus the scale is prevented from directly receiving the outside air, and change in temperature inside the groove is also suppressed. Thus, expansion and contraction of the scale due to change in temperature of outside air is reliably suppressed.

In a three-dimensional coordinate measurement apparatus according to yet another aspect of the present invention, there is provided a thermal insulation member configured to cover a side surface of the surface plate along the X-axis direction. Accordingly, heat transferring from the side surface of the surface plate to the inside of the surface plate or to outside air is reduced by the thermal insulation member. As a result, even if ambient temperature of the surface plate changes, temperature inside the surface plate is less likely to change, whereby deformation of the surface plate is suppressed. In addition, even if temperature inside the surface plate changes, occurrence of a temperature gradient in the Y-axis direction is suppressed. As a result, at least deterioration in straightness of the first side surface is suppressed, and movement of the Y carriage in the Y-axis direction is accurately performed.

In a three-dimensional coordinate measurement apparatus according to yet another aspect of the present invention, each of the vertical support member, the side surface support member, and the top surface support member, is an air pad.

In a three-dimensional coordinate measurement apparatus according to yet another aspect of the present invention, the surface plate is made of stone.

Advantageous Effects of Invention

According to the three-dimensional coordinate measurement apparatus of the present invention, measurement accuracy can be improved by suppressing shaking of the Y carriage.

In addition, according to the three-dimensional coordinate measurement apparatus of the present invention, it is possible to improve measurement accuracy of a position of the Y carriage in the Y-axis direction, that is, measurement accuracy of a Y coordinate value of the measuring object.

Further, according to the three-dimensional coordinate measurement apparatus of the present invention, deformation of the surface plate can be suppressed and measurement can be performed with high accuracy.

DESCRIPTION OF THE EMBODIMENTS

Hereinafter, preferred embodiments of the present invention will be described in detail with reference to accompanying drawings.

Figure 1:
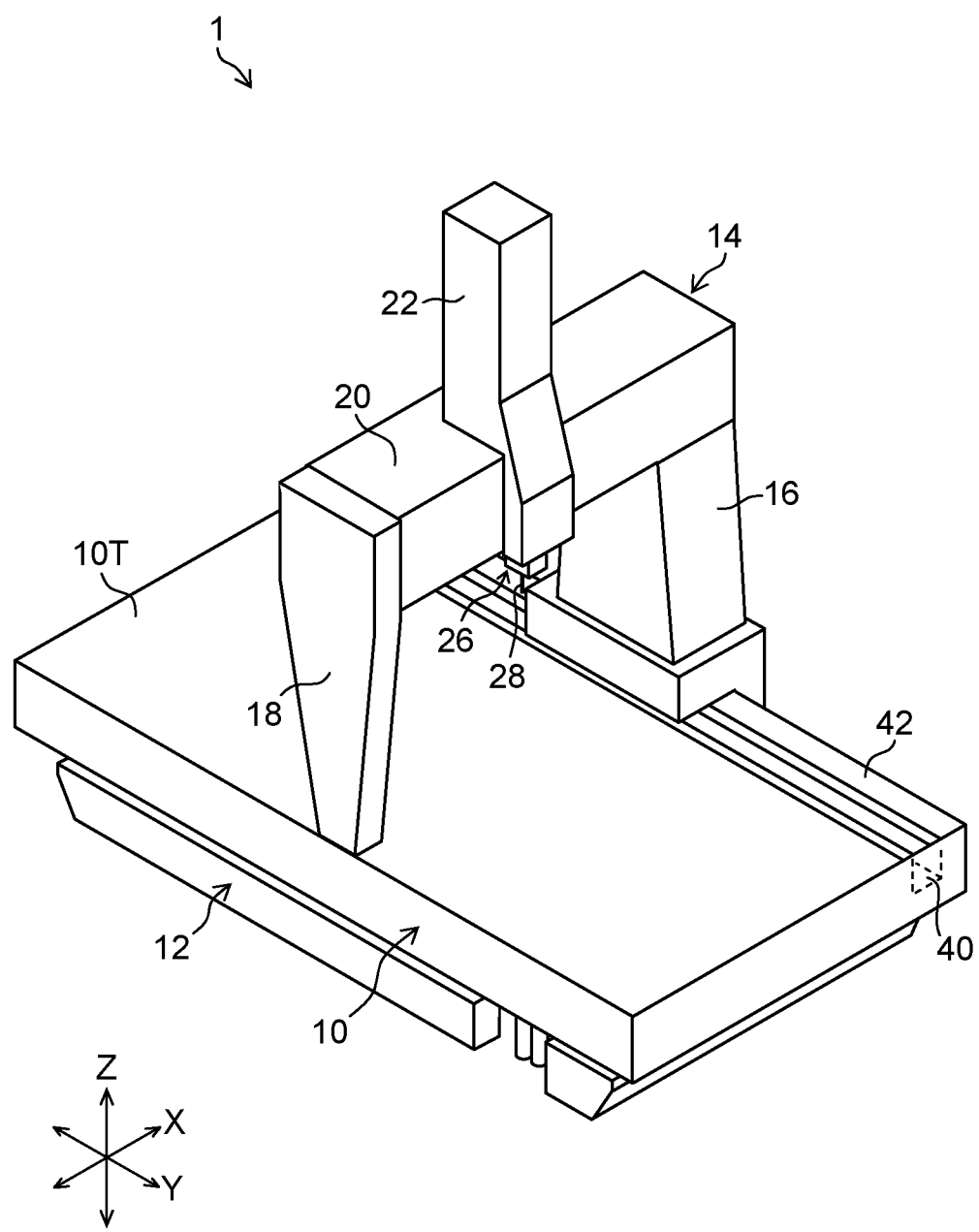
FIG. 1 is a perspective view illustrating an appearance of a three-dimensional coordinate measurement apparatus to which the present invention is applied (first embodiment).
Figure 2:
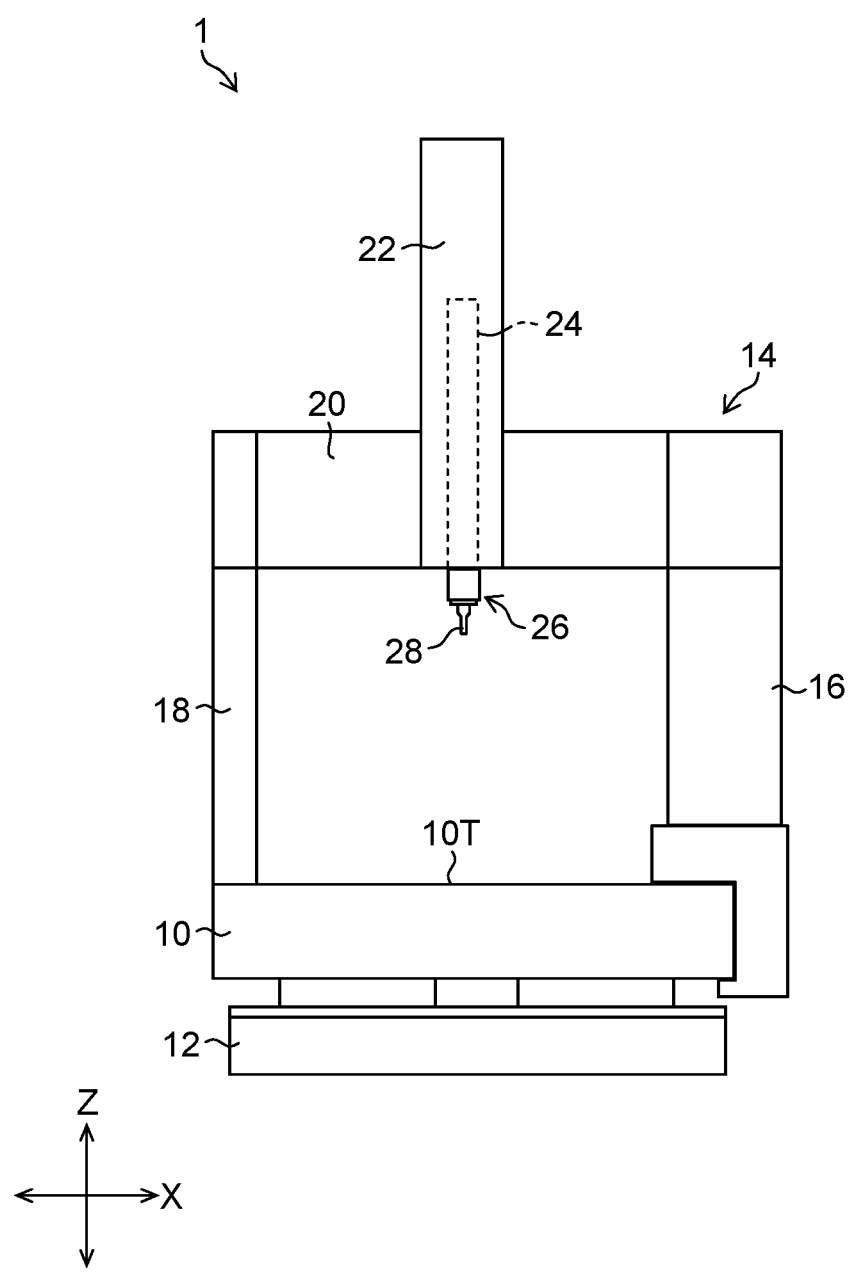
FIG. 2 is a front view illustrating the appearance of the three-dimensional coordinate measurement apparatus to which the present invention is applied.

FIGS. 1 and 2 are respectively a perspective view and a front view each illustrating an appearance of a three-dimensional coordinate measurement apparatus 1 to which the present invention is applied (first embodiment).

The three-dimensional coordinate measurement apparatus 1 illustrated in FIGS. 1 and 2 includes a surface plate 10 supported by an installation face (floor face) through a mount base 12. The surface plate 10 is integrally formed of stone such as granite (Mikage) and marble (limestone, crystalline limestone) in a shape of a rectangle, and includes a flat top surface 10T on which a measuring object is placed. The top surface 10T is disposed parallel to an X-axis and a Y-axis, or perpendicular to a Z-axis. The surface plate 10 is not limited to a surface plate made of stone.

On the top surface 10T of the surface plate 10, a Y carriage 14 in a portal shape is provided across the surface plate 10. The Y carriage 14 includes a right Y carriage 16 being a first strut member and a left Y carriage 18 being a second strut member that are respectively erected on a right side and a left side (one side) of the surface plate 10 and extend along a Z-axis direction as viewed from the front, and a columnar X guide 20 extending along an X-axis direction to bridge upper ends of the right Y carriage 16 and the left Y carriage 18.

A lower end of the right Y carriage 16 is movably supported by a Y guide 42 formed in the surface plate 10 along a Y-axis direction, which is described below. At the lower end of the right Y carriage 16, there is provided a driving unit that is brought into contact with the Y guide 42, and the right Y carriage 16 is moved along the Y guide 42 by driving force of the driving unit. A lower end of the left Y carriage 18 is slidably supported by the top surface 10T of the surface plate 10.

Accordingly, the Y carriage 14 is supported to be movable in the Y-axis direction with respect to the surface plate 10, and is moved in the Y-axis direction by the driving unit provided at the lower end of the right Y carriage 16 while the right Y carriage 16 serves as a driving side and the left Y carriage 18 serves as a driven side.

In the X guide 20, a Z column 22 is movably supported along the X guide 20. The Z column 22 includes a built-in driving unit being brought into contact with the X guide 20, and is moved in the X-axis direction along the X guide 20 by driving force of the driving unit.

In the Z column 22, there is provided a columnar Z carriage 24 that extends along the Z-axis, and that is supported to be movable in the Z-axis direction (refer to FIG. 2), and a lower end of the Z carriage 24 projects from a lower end of the Z column 22. The Z column 22 includes a built-in driving unit being brought into contact with the Z carriage 24, and the Z carriage 24 is moved in the Z-axis direction by driving force of the driving unit.

At the lower end of the Z carriage 24, a measuring probe 26, such as a touch probe, is attached. The measuring probe 26 includes a rod-like stylus 28 with a tip ball, for example, and the measuring probe 26 detects whether a tip (tip ball) of the stylus 28 is brought into contact with a measuring object, and detects a displacement amount of the stylus 28 caused by contact of the tip of the stylus 28 with the measuring object.

The three-dimensional coordinate measurement apparatus 1 configured as described above moves the stylus 28 of the measuring probe 26 in the X-axis, Y-axis, and Z-axis directions by using movement of the Y carriage 14 in the Y-axis direction, movement of the Z column 22 in the X-axis direction, and movement of the Z carriage 24 in the Z-axis direction, to move the tip (tip ball) of the stylus 28 along a surface of the measuring object placed on the top surface 10T of the surface plate 10. Then, a three-dimensional coordinate of each position in the surface of the measuring object is measured by measuring a position (movement amount) of the Y carriage 14 in the Y-axis direction, a position (movement amount) of the Z column 22 in the X-axis direction, a position (movement amount) of the Z carriage 24 in the Z-axis direction, and a position (displacement amount) of the stylus 28, at the time. Since processing related to measurement of a three-dimensional coordinate is well-known, detailed description thereof is eliminated.

Subsequently, a Y driving mechanism that supports the Y carriage 14 in a movable manner in the Y-axis direction as well as moves it in the Y-axis direction will be described.

First, support means (a Y guide mechanism and two strut members) of the Y carriage 14, in the Y driving mechanism, will be described.

Figure 3:
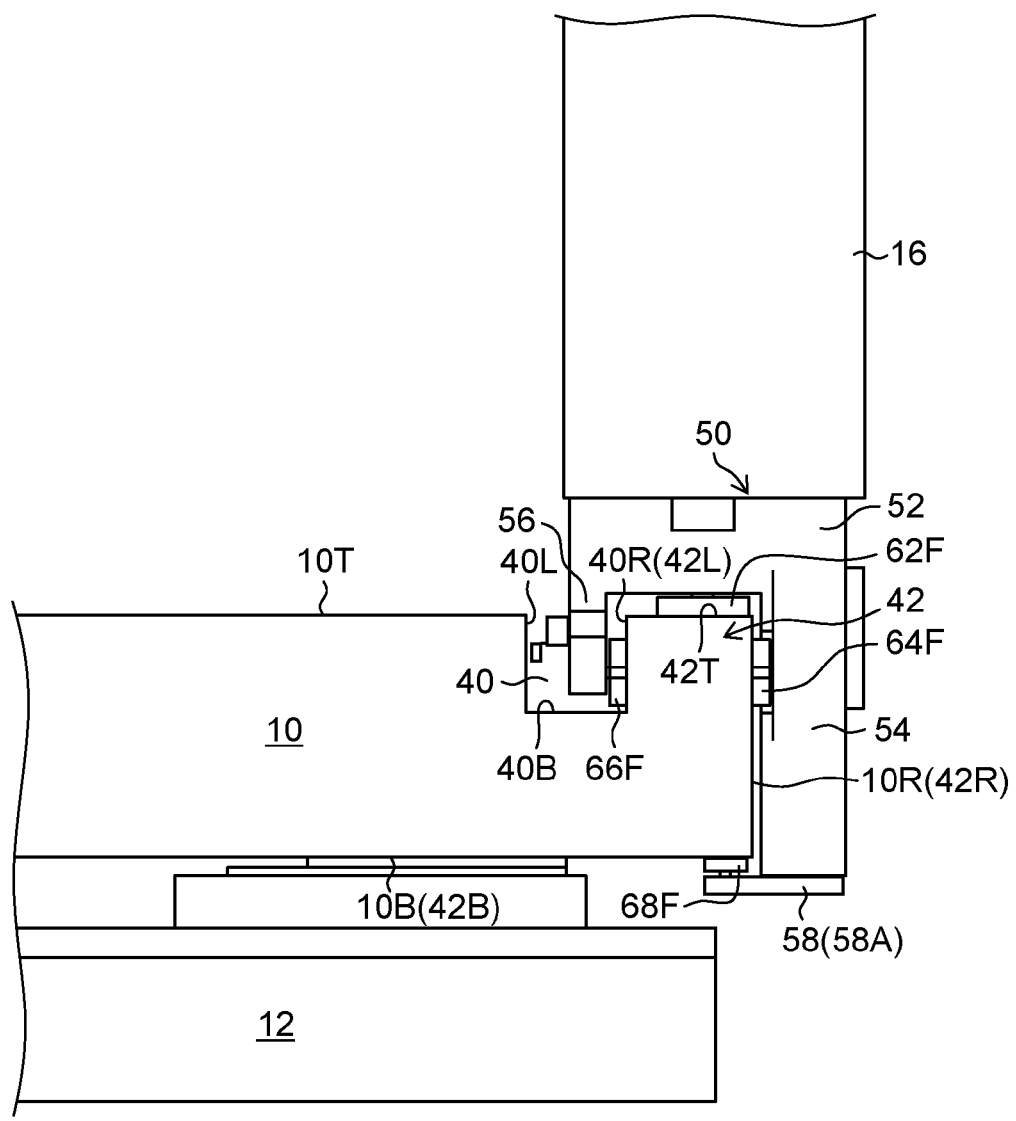
FIG. 3 is a front view illustrating a right side part of a surface plate in an enlarged manner.
Figure 4:
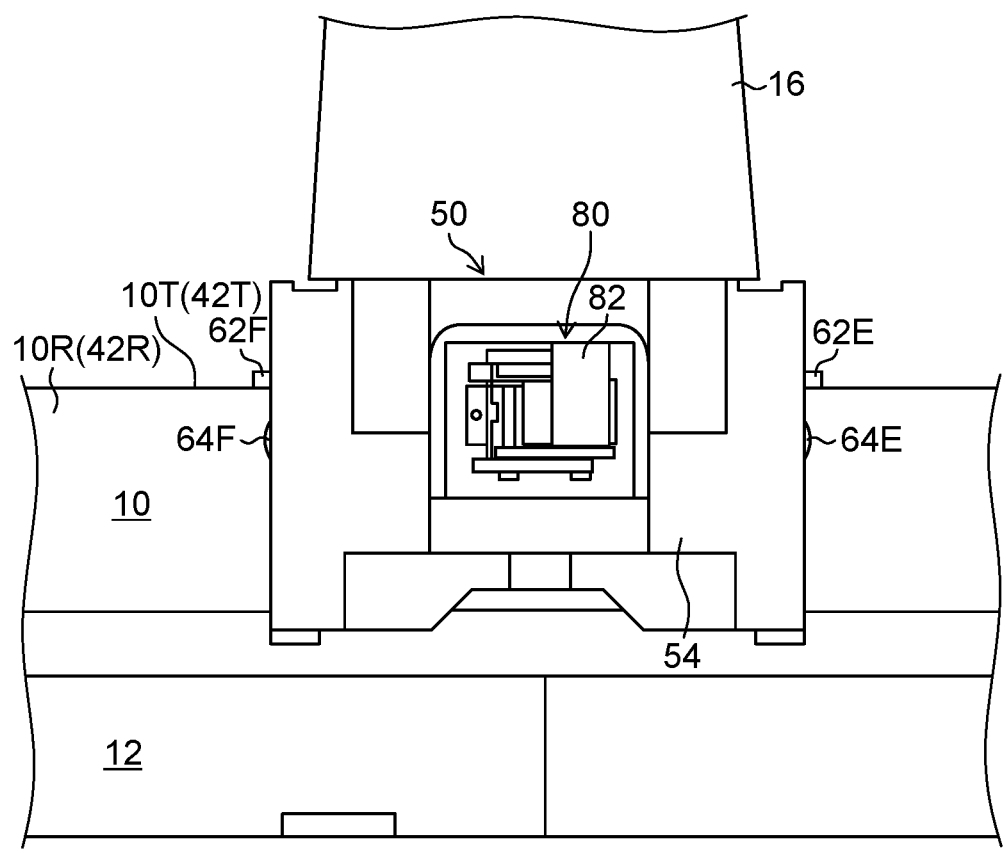
FIG. 4 is a right side view illustrating a right side part of the surface plate in an enlarged manner.

FIGS. 3 and 4 are respectively a front view and a right side view each illustrating a right side part of the surface plate 10 in an enlarged manner.

As described in FIG. 3, the surface plate 10 includes the top surface 10T and a bottom surface 10B which are perpendicular to the Z-axis, and a right side surface 10R (corresponding to a first side surface of the present invention) which is perpendicular to the X-axis. In addition, a groove 40 along the Y-axis direction is formed in the top surface 10T of the surface plate 10, near the right side surface 10R of the surface plate 10.

While FIGS. 1 and 2 each illustrate a state where a flexible covering member, such as a bellows cover, is provided over an upper opening of the groove 40, and a plate-shaped covering member, such as a metal cover, is attached to each of side surfaces on the front and rear sides of the surface plate 10, FIGS. 3 and 4 each illustrate a state where the covering members are removed.

The groove 40 includes a right side surface 40R (corresponding to a second side surface of the present invention) and a left side surface 40L (corresponding to a third side surface of the present invention) which are perpendicular to the X-axis and facing each other, and a bottom surface 40B which is perpendicular to the Z axis.

Accordingly, the Y guide 42 extending along the Y-axis direction is formed by the right side surface 40R of the groove 40, the right side surface 10R of the surface plate 10, the top surface 10T of the surface plate 10 which is between the right side surfaces above, and the bottom surface 10B of the surface plate 10.

The right side surface 10R of the surface plate 10, and the right side surface 40R and the left side surface 40L of the groove 40, are not necessarily perpendicular the X-axis as long as they are formed along the Y-axis direction. In addition, the bottom surface 10B of the surface plate 10 and the bottom surface 40B of the groove 40 are not necessarily perpendicular to the Z-axis.

Hereinafter, the right side surface 40R of the groove 40 is indicated as a left side surface 42L of the Y guide 42, the right side surface 10R of the surface plate 10 is indicated as a right side surface 42R of the Y guide 42, the top surface 10T of the surface plate 10 which is between the right side surfaces above, is indicated as a top surface 42T of the Y guide 42, and the bottom surface 10B of the surface plate 10 is indicated as a bottom surface 42B of the Y guide 42.

Figure 5:
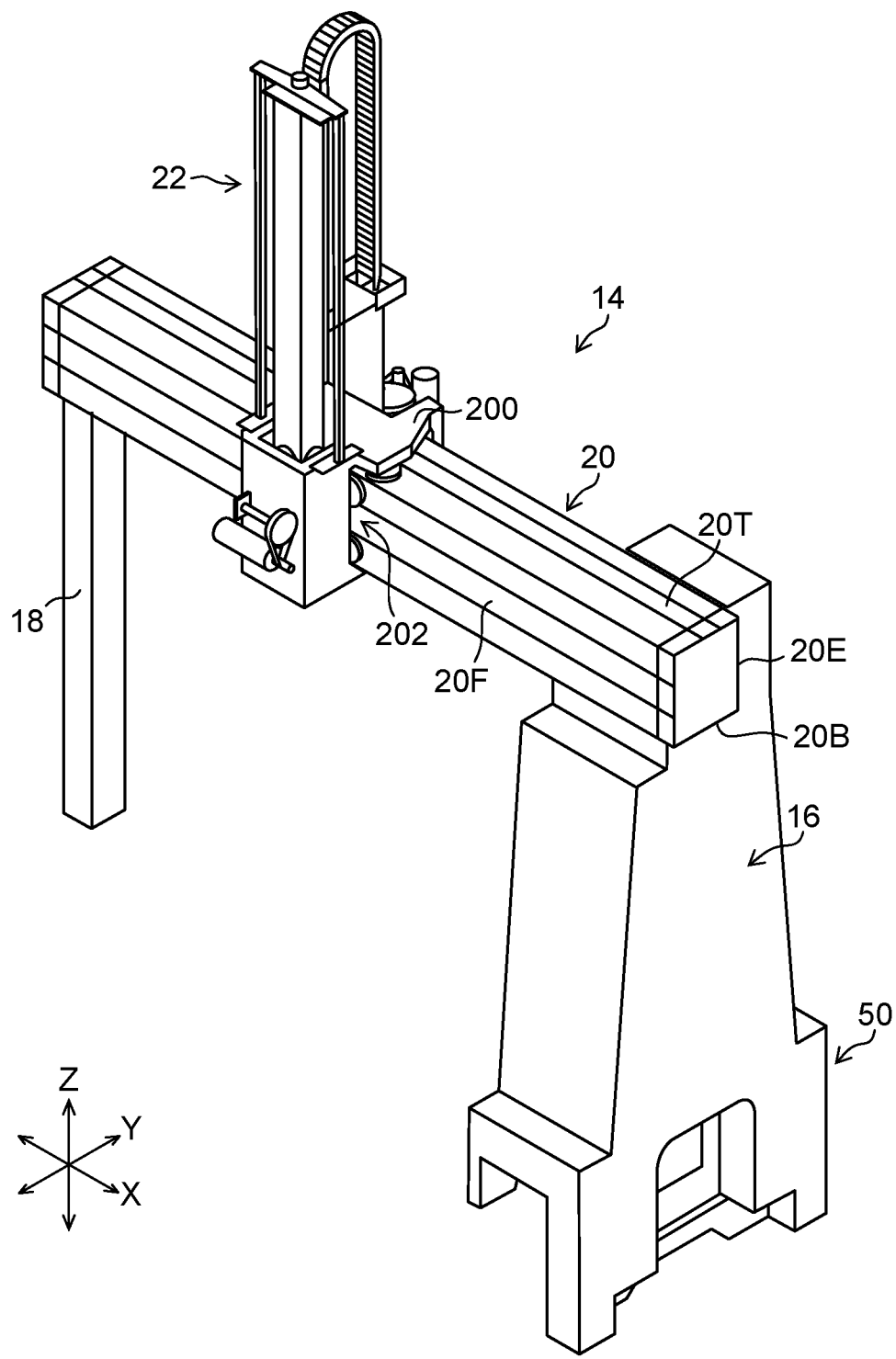
FIG. 5 is a perspective view illustrating a Y carriage from which a cover is removed.

Meanwhile, FIG. 5 is a perspective view illustrating the Y carriage 14 in which a cover of each unit is removed, and as illustrated in FIGS. 4 and 5, a support section 50 which has a wide width in the Y-axis direction is provided at the lower end of the right Y carriage 16.

The support section 50 is formed in a forked shape as viewed from the front, as illustrated in FIG. 3.

FIGS. 3 and 4 each illustrate a state where covering members for covering the support section 50 are removed.

As mainly illustrated in FIG. 3, the support section 50 includes a base end part 52 that faces the top surface 42T of the Y guide 42 and is disposed along a direction orthogonal to the Z-axis (horizontal direction), a right side part 54 that extends from the base end part 52 in the Z-axis direction and is disposed on a side facing the right side surface 42R of the Y guide 42, and a left side part 56 that extends from the base end part 52 in the Z-axis direction and is disposed on a side facing the left side surface 42L of the Y guide 42.

At a lower end of the right side part 54, there are provided support plates 58A and 58A extending in the X-axis direction to a position facing the bottom surface 42B of the Y guide 42, as a leading end part 58 of the support section 50.

As shown below, in each of the base end part 52, the right side part 54, the left side part 56, and the leading end part 58, of the support section 50, there is provided a plurality of disk-shaped air pads each of which ejects air so that the support section 50 is slidable with respect to the Y guide 42. The lower end part of the left Y carriage 18 is also provided with a disk-shaped air pad that ejects air so that the left Y carriage 18 is slidable with respect to the top surface 10T of the surface plate 10.

Figure 6:
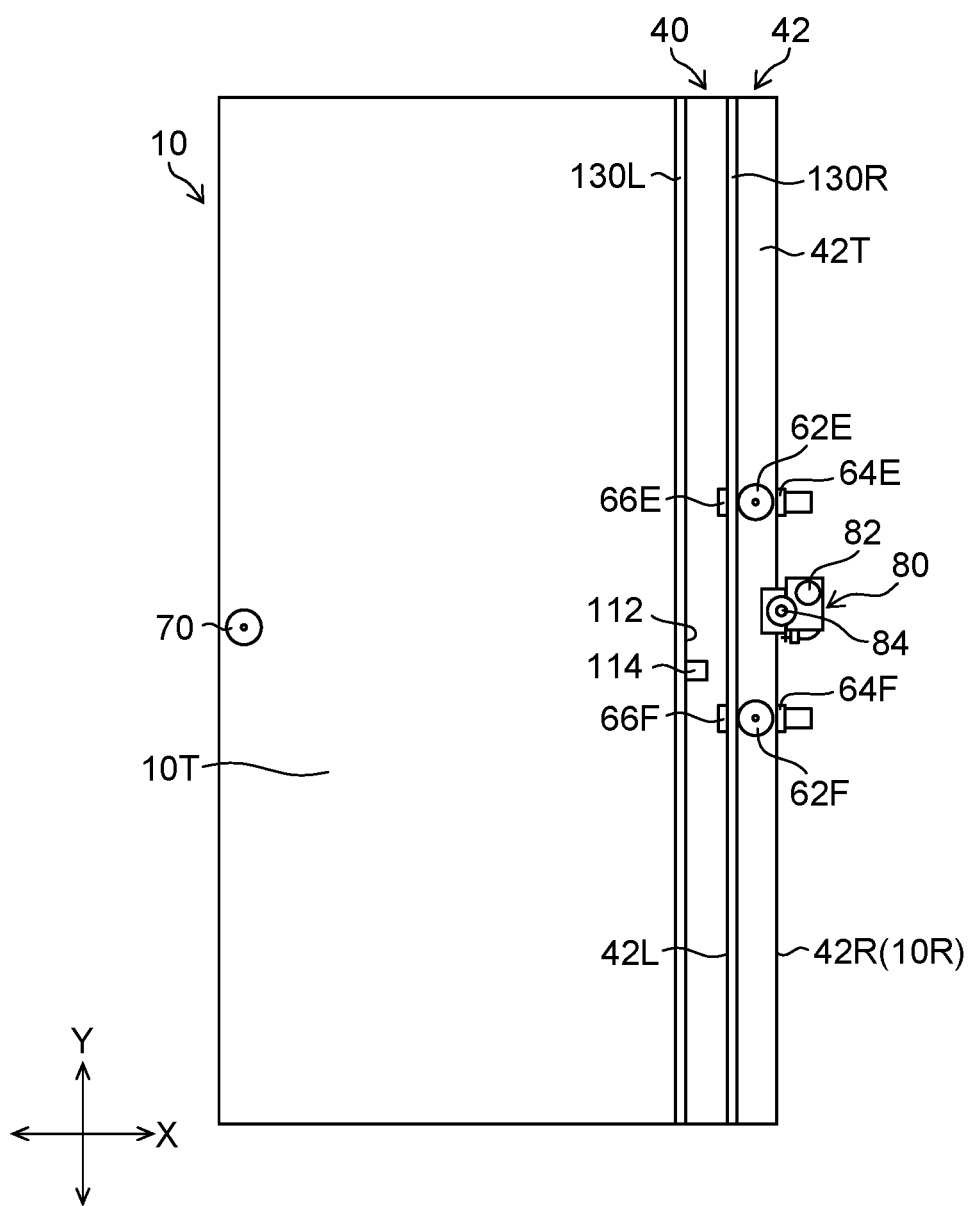
FIG. 6 is a top view illustrating a top surface of the surface plate and a placement of air pads provided in the Y carriage with respect to the surface plate (first embodiment).
Figure 7:
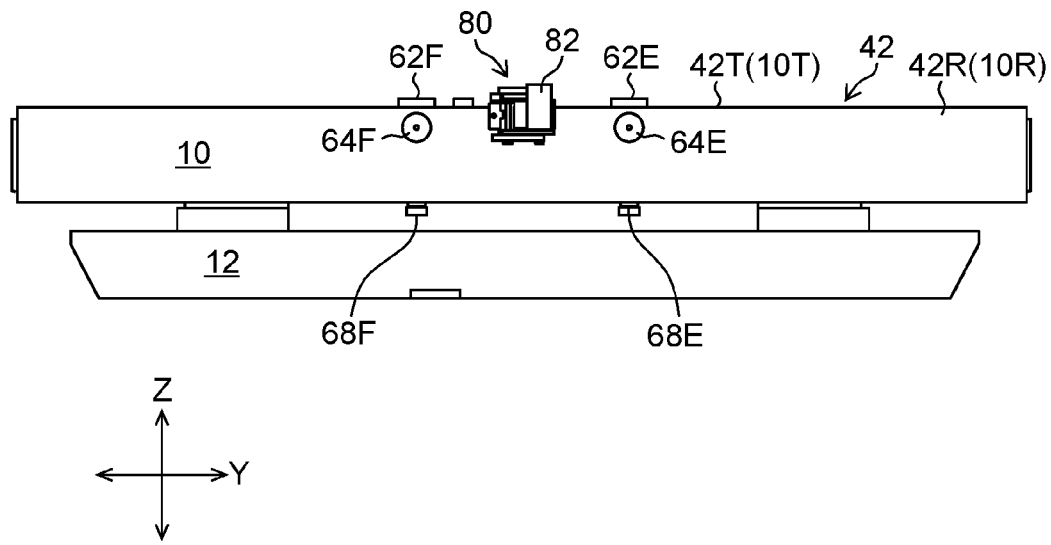
FIG. 7 is a right side view illustrating a right side surface of the surface plate and an arrangement of the air pads provided in the Y carriage with respect to the surface plate (first embodiment).

FIGS. 6 and 7 are respectively a top view and a right side view illustrating the top surface 10T and the right side surface 10R of the surface plate 10, in each of which an arrangement of air pads provided in the Y carriage 14 with respect to the surface plate 10 is illustrated.

In FIGS. 6 and 7, two air pads 62F and 62E (corresponding to the vertical support member of the present invention) disposed along the top surface 42T of the Y guide 42 are respectively provided at two places along the Y-axis direction (two places on a straight line parallel to the Y-axis) in the base end part 52 of the support section 50, and are disposed downward to face the top surface 42T of the Y guide 42.

Two air pads 64F and 64E (corresponding to the side surface support member of the present invention) disposed along the right side surface 42R of the Y guide 42 are respectively provided at two places along the Y-axis direction (two places on a straight line parallel to the Y-axis) in the right side part 54 of the support section 50, and are disposed toward the left to face the right side surface 42R of the Y guide 42.

Two air pads 66F and 66E (corresponding to the side surface support member of the present invention) disposed along the left side surface 42L of the Y guide 42 (the right side surface 40R of the groove 40) are respectively provided at two places along the Y-axis direction (two places on a straight line parallel to the Y-axis) in the left side part 56 of the support section 50, and are disposed toward the right to face the left side surface 42L of the Y guide 42. The air pads 64F, 64E, 66F, and 66E respectively correspond to the first support member, second support member, third support member, and fourth support member, of the present invention.

Two air pads 68F and 68E (refer to FIGS. 3 and 7, corresponding to the vertical support member of the present invention) disposed along the bottom surface 42B of the Y guide 42 are respectively provided at two places along the Y-axis direction (two places on a straight line parallel to the Y-axis) in the leading end part 58 of the support section 50, and are disposed upward to face the bottom surface of the Y guide 42. The air pads 62F, 62E, 68F, and 68E respectively correspond to the fifth support member, sixth support member, seventh support member, and eighth support member, of the present invention.

An air pad 70 (corresponding to the top surface support member of the present invention) disposed on the top surface of the surface plate 10, near the left side surface of the surface plate 10, is provided at the lower end part of the left Y carriage 18, and is disposed downward to face the top surface 10T of the surface plate 10.

Here, the air pads 62F, 64F, 66F, and 68F each provided on a front side (front face side) of the base end part 52, the right side part 54, the left side part 56 and the leading end part 58, of the support section 50, are disposed at a substantially identical position in the Y-axis direction (or disposed at a position along the same XZ plane). The air pads 62E, 64E, 66E, and 68E each provided on a rear side (rear face side) of the base end part 52, the right side part 54, the left side part 56 and the leading end part 58, are disposed at a substantially identical position in the Y-axis direction.

The air pads 64F and 64E provided in the right side part 54 of the support section 50 and the air pads 66F and 66E provided in the left side part 56 thereof are disposed at respective positions facing each other (or a substantially identical position in the Z-axis direction).

The air pads 62F and 62E provided in the base end part 52 of the support section 50 and the air pads 68F and 68E provided in the leading end part 58 thereof are disposed at respective positions facing each other (or a substantially identical position in the X-axis direction).

The air pad 70 provided at the lower end of the left Y carriage 18 is disposed such that its position in the Y-axis direction is substantially identical to a position, in the Y-axis direction, of the center of gravity of all members (the Y carriage 14 and the Z column 22) that move in the Y-axis direction together with the Y carriage 14.

While the air pads 62F, 62E, and 70 each have a diameter of 110 mm, for example, an air pad with a diameter less than that of each of the air pads 62F, 62E, and 70, such as with a diameter of 80 mm, is used for the air pads 64F, 64E, 66F, and 66E. For the air pads 68F and 68E, an air pad with a diameter less than that of each of the air pads 64F, 64E, 66F, and 66E, such as with a diameter of 60 mm, is used.

As a reference, for the surface plate 10, a surface plate with a width in the X-axis direction (lateral width) within a range from about 800 mm to about 1000 mm, and with a width in the Y-axis direction (depth) within a range from about 1200 mm to about 2700 mm is used, the Y carriage 14 has a width in the Z-axis direction (height) within a range from about 600 mm to about 800 mm, and the support section 50 has a width in the Y-axis direction (depth) of about 650 mm.

According to the support means of the Y carriage 14, formed as described above, the Y carriage 14 is supported by the Y guide 42 (surface plate 10) through the air pad 62F, 62E, 64F, 64E, 66F, 66E, 68F, and 68E in the support section 50 in the right Y carriage 16. That is, the Y carriage 14 is supported by the Y guide 42 through engagement between the support section 50 and the Y guide 42. Besides this, the Y carriage 14 is supported by the surface plate 10 (top surface 10T) through the air pad 70 provided in the left Y carriage 18.

Each of the air pads 62F, 62E, 64F, 64E, 66F, 66E, 68F, 68E, and 70 ejects air to cause each of the air pads 62F, 62E, 64F, 64E, 66F, 66E, 68F, and 68E in the support section 50 in the right Y carriage 16 to be slidable in the Y-axis direction with respect to the Y guide 42, as well as to cause the air pad 70 in the left Y carriage 18 to be slidable with respect to the top surface 10T of the surface plate 10.

Thus, the Y carriage 14 becomes movable in the Y-axis direction with respect to the surface plate 10.

Subsequently, drive means for the Y carriage 14, in the Y driving mechanism, will be described.

As illustrated in FIG. 4, a driving unit 80 is provided in the right side part 54 of the support section 50. As also illustrated in FIGS. 6 and 7, the driving unit 80 is disposed at a substantially intermediate position between the two air pads 64F and 64E provided in the right side part 54 of the support section 50. The driving unit 80 may be disposed at a position that is in the left side part 56 of the support section 50 and is a substantially intermediate position between the air pads 66F and 66E.

The driving unit 80 includes a motor 82, a roller 84 that is rotatable, and a speed reducer (speed reduction mechanism) that couples the motor and the roller to each other to allow power transmission, which are assembled in a support member to be integrally formed, and the motor 82 is driven to rotate the roller 84.

As illustrated in FIG. 6, the driving unit 80 is provided in the right side part 54 of the support section 50 such that a rotation axis of the roller 84 is parallel to the Z-axis and an outer peripheral surface of the roller 84 is brought into contact with the right side surface 42R of the Y guide 42 (the right side surface 10R of the surface plate 10) at a substantially intermediate position between the two air pads 64F and 64E.

Thus, the support section 50 is moved along the Y guide 42 by driving the motor 82 of the driving unit 80 to rotate the roller 84, and then the Y carriage 14 is moved in the Y-axis direction.

As drive means for Y carriage 14, a driving unit which is brought into contact with the left side surface 42L of the Y guide 42 may be provided along with the driving unit 80 so as to face the driving unit 80. A driving unit which is brought into contact with the left side surface 42L of the Y guide 42 may be only provided instead of the driving unit 80.

Subsequently, position detection means of the Y carriage 14, in the Y driving mechanism, will be described.

Figure 8:
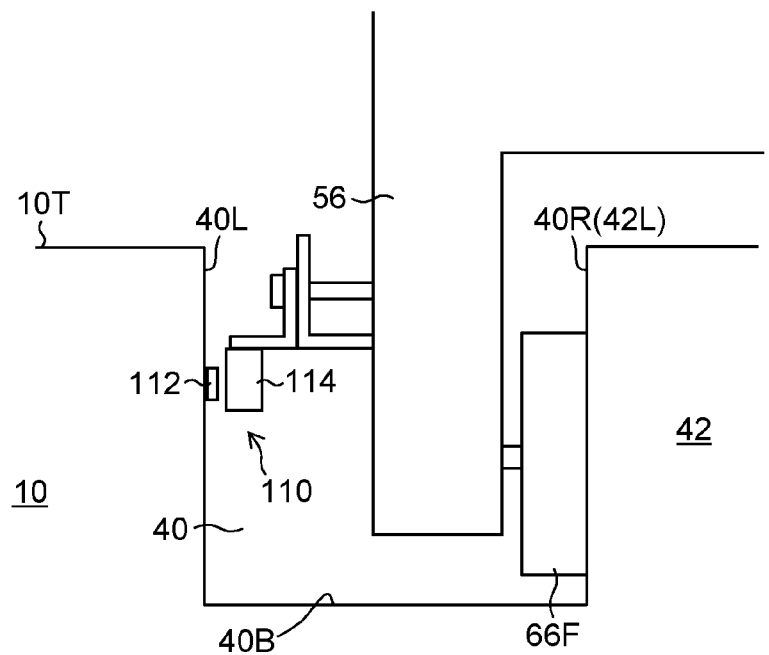
FIG. 8 is a front view illustrating a part of a groove of the surface plate in an enlarged manner.

FIG. 8 is a front view illustrating a part of the groove 40 of the surface plate 10 in an enlarged manner. As illustrated in FIG. 8, a scale 112 in the shape of an elongated plate constituting an optical linear encoder 110, the scale 112 including a grid scale, is provided on the left side surface 40L of the groove 40 along the Y-axis direction, for example (refer to FIG. 6).

Meanwhile, an optical sensor 114 constituting the linear encoder 110 is disposed at a position facing the scale 112, in the left side part 56 of the support section 50 (refer to FIG. 6). Then, a detection signal in accordance with the grid scale of the scale 112 formed at the position facing the optical sensor 114 is outputted from the optical sensor 114.

According to the linear encoder 110, when the Y carriage 14 is moved in the Y-axis direction, the optical sensor 114 is moved in the Y-axis direction together with the Y carriage 14, and the position of the optical sensor 114 facing the scale changes with respect to the scale 112. At this time, a position of the Y carriage 14 in the Y-axis direction is detected on the basis of a detection signal outputted from the optical sensor 114.

Subsequently, an X driving mechanism that supports the Z column 22 in a movable manner in the X-axis direction and moves it in the X-axis direction will be described.

First, support means (an X guide mechanism) of the Z column 22, in the X driving mechanism, will be described.

FIG. 5 illustrates the Y carriage 14 from which a cover is removed as described above, and FIGS. 9, 10, and 11 each illustrate the Z column 22 removed from the X guide 20. As illustrated in these drawings, the Z column 22 includes a support section 200 into which various components are assembled, and the support section 200 corresponds to the X carriage. The support section 200 is provided with an X guide insertion hole 202 along the X-axis direction in the shape of a rectangle and the X guide 20 in the shape of a quadrangular prism is inserted into the X guide insertion hole 202.

In the support section 200, there is provided a disk-shaped air pad in each of a front surface 202F, a rear surface 202E, a top surface 202T, and a bottom surface 202B (referred to as a front surface 202F and so on, of the X guide insertion hole 202, for example) which define the X guide insertion hole 202, and the disk-shaped air pads eject air to allow the support section 200 to be slidable with respect to the X guide 20.

Figure 10:
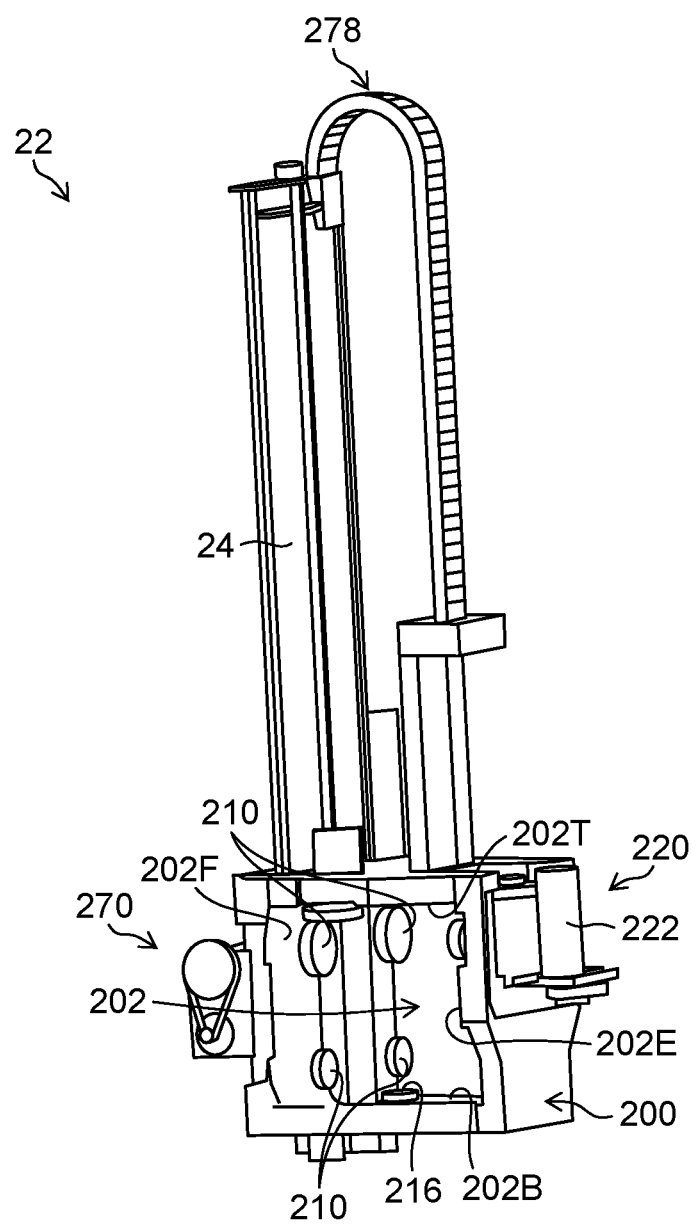
FIG. 10 is a perspective view illustrating the Z column removed from the X guide.

In the front surface 202F of the X guide insertion hole 202, as illustrated in FIG. 10, a total of four air pads 210, 210, 210, and 210 are disposed at respective four places that are vertically and laterally symmetrical, and are disposed backward to face a front surface 20F (refer to FIG. 5) of the X guide 20.

Figure 11:
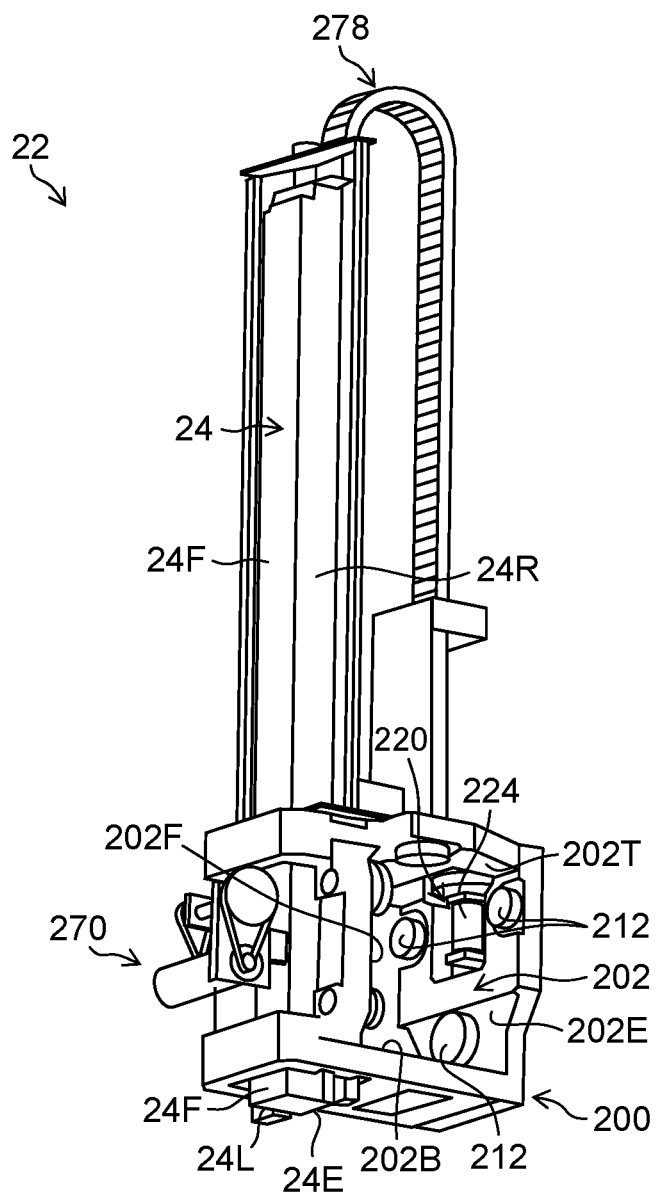
FIG. 11 is a perspective view illustrating the Z column removed from the X guide.

In the rear surface 202E of the X guide insertion hole 202, as illustrated in FIG. 11, a total of three air pads 212, 212, and 212 are disposed at respective two upper places and one lower place, and are disposed forward to face a rear surface 20E (refer to FIG. 5) of the X guide 20.

Figure 9:
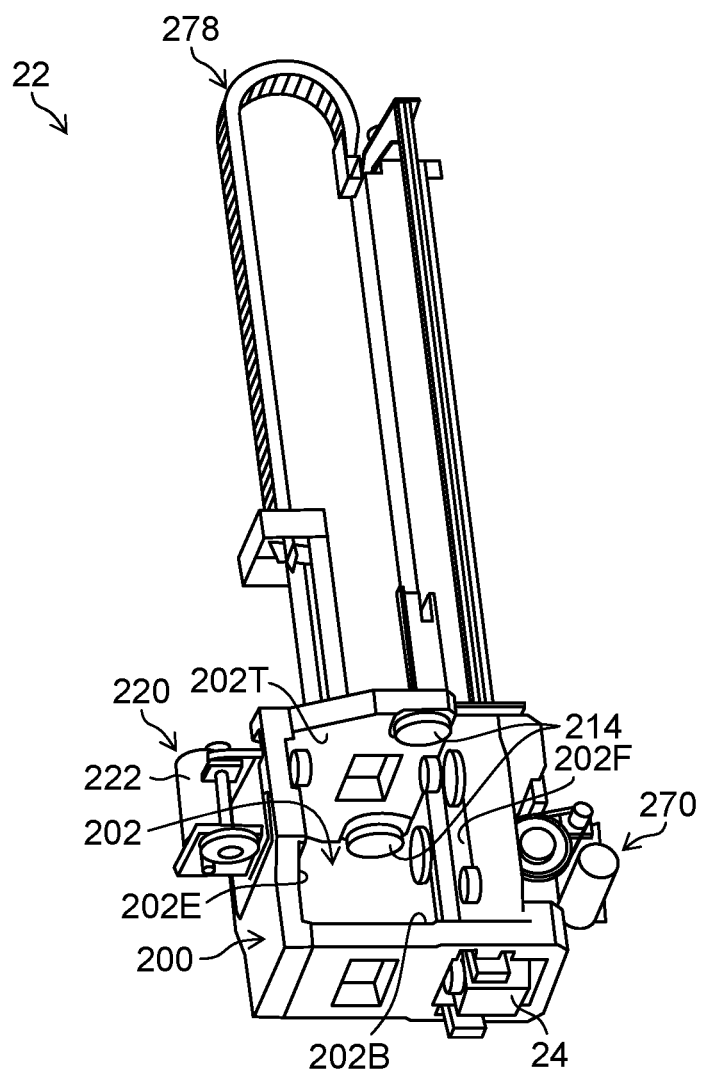
FIG. 9 is a perspective view illustrating a Z column removed from an X guide.

In the top surface 202T of the X guide insertion hole 202, as illustrated in FIG. 9, a total of two air pads 214 and 214 are disposed at respective two right and left places, and are disposed downward to face a top surface 20T (refer to FIG. 5) of the X guide 20.

In the bottom surface 202B of the X guide insertion hole 202, as illustrated in FIG. 10, an air pad 216 is disposed, and are disposed upward to face a bottom surface 20B (refer to FIG. 5) of the X guide 20.

According to the support means of the Z column 22 formed as described above, when the X guide 20 is inserted into the X guide insertion hole 202 of the support section 200, the support section 200 is supported by the X guide 20 through the air pads 210, 212, 214, and 216, and the Z column 22 is supported by the X guide 20 through the support section 200.

Each of the air pads 210, 212, 214, and 216 ejects air to allow the corresponding one of the air pads 210, 212, 214, and 216 in the support section 200 to be slidable in the X-axis direction with respect to the X guide 20.

Thus, the Z column 22 becomes movable in the X-axis direction.

Subsequently, drive means for the Z column 22, in the X driving mechanism, will be described.

As illustrated in FIGS. 9 to 11, in the rear surface 202E of the X guide insertion hole 202, there is provided a driving unit 220 that has a structure similar to that of the driving unit 80 in the Y driving mechanism described above, and that includes a motor 222 and a roller 224 (refer to FIG. 11). The driving unit 220 is provided in the rear surface 202E of the X guide insertion hole 202 such that a rotation axis of the roller 224 is parallel to the Z-axis and an outer peripheral surface of the roller 224 is brought into contact with the rear surface 20E (refer to FIG. 5) of the X guide 20 at a substantially intermediate position between the two air pads 212 and 212 provided on an upper side of the rear surface 202E of the X guide insertion hole 202.

Thus, the support section 200 is moved along the X guide 20 by driving the motor 222 of the driving unit 220 to rotate the roller 224, and the Z column 22 is moved in the X-axis direction.

There is provided an optical linear encoder similar to the linear encoder 110 in the Y driving mechanism described above in the X guide 20 and the support section 200, as position detection means for the Z column 22 in the X driving mechanism, a scale in a shape of an elongated plate is provided along the X-axis direction in the X guide 20, and an optical sensor is provided at a position facing the scale in the support section 200.

Subsequently, a Z driving mechanism that supports the Z carriage 24 in a movable manner in the Z-axis direction and moves it in the Z-axis direction will be described.

First, support means (Z guide mechanism) of the Z carriage 24, in the Z driving mechanism, will be described.

Figure 12:
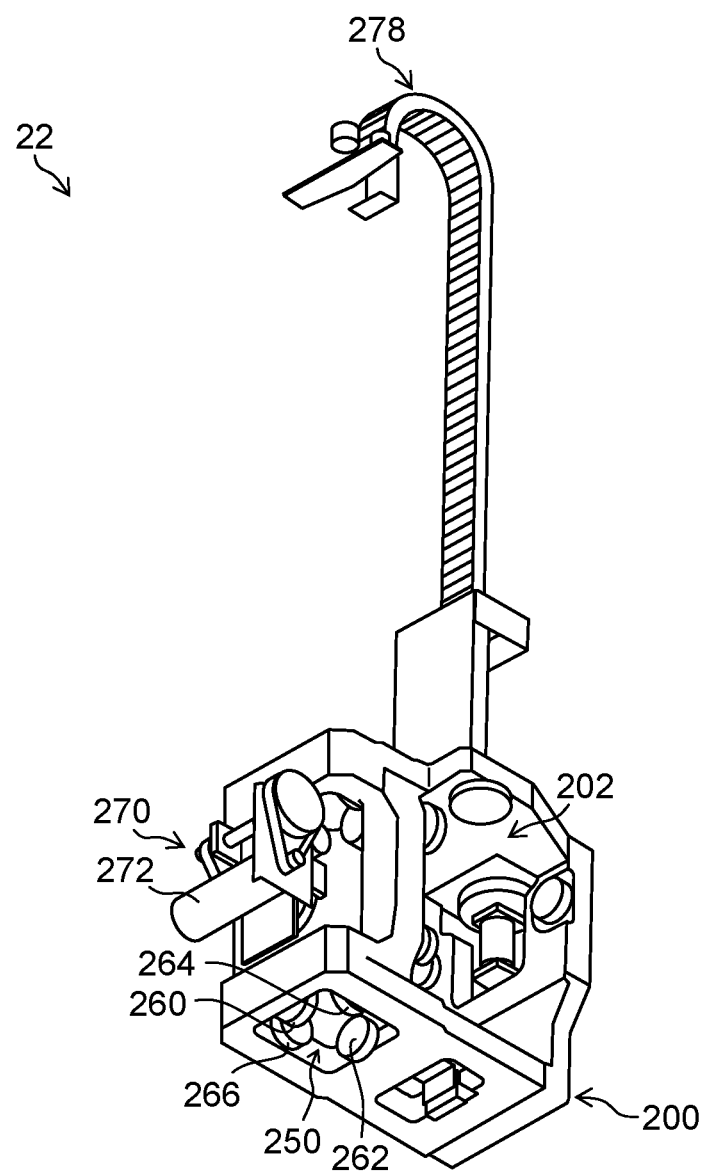
FIG. 12 is a perspective view illustrating a support section of the Z column removed from the X guide.
Figure 13:
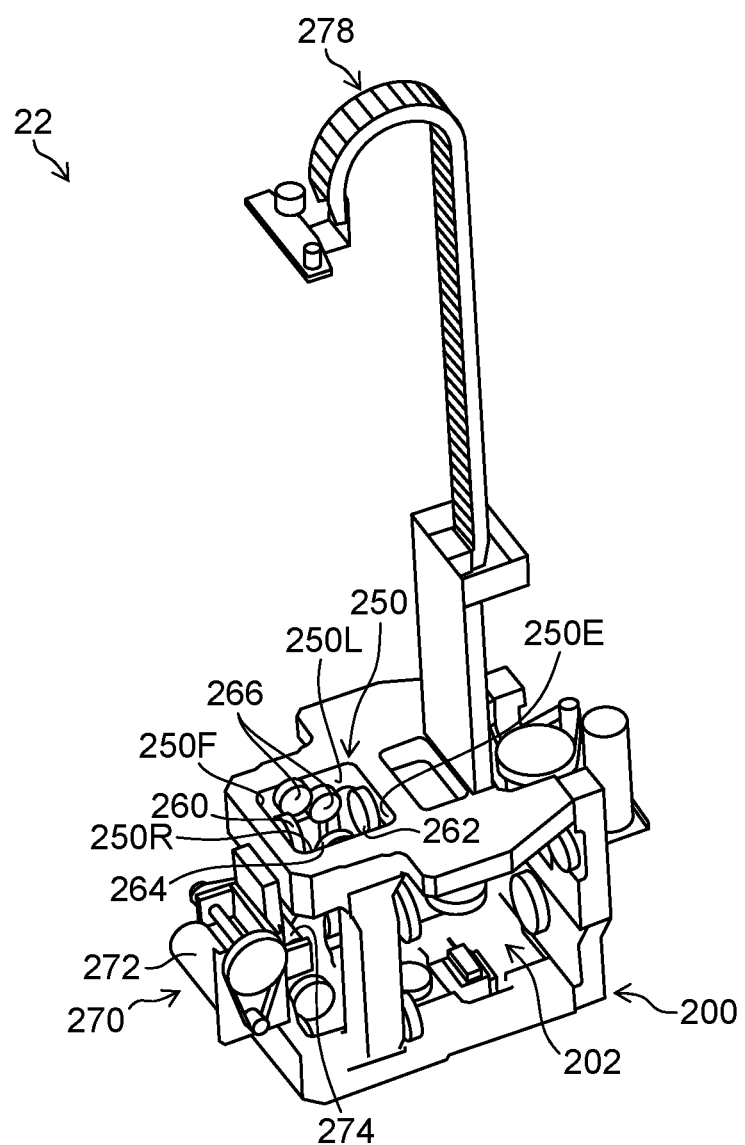
FIG. 13 is a perspective view illustrating the support section of the Z column removed from the X guide.

FIGS. 12 and 13 illustrates a state where the Z carriage 24 is removed from the support section 200 of the Z column 22 illustrated in each of FIGS. 9 to 11. As illustrated in FIGS. 12 and 13, the support section 200 includes a Z carriage insertion hole 250 in a shape of rectangle along the Z-axis direction on a front side of the X guide insertion hole 202, and the Z carriage 24 in a shape of a quadrangular prism is inserted into the Z carriage insertion hole 250.

In the support section 200, there is provided an air pad in each of a front surface 250F, a rear surface 250E, a right side surface 250R, and a left side surface 250L (referred to as a front surface 250F of the Z carriage insertion hole 250, for example) which define the Z carriage insertion hole 250 (refer to FIG. 13), and the air pads eject air to allow the support section 200 to be slidable with respect to the Z carriage 24.

As illustrated in FIG. 12, near a lower opening of the Z carriage insertion hole 250, a total of four air pads 260, 262, 264, and 266 are respectively disposed at the front surface 250F, the rear surface 250E, the right side surface 250R, and the left side surface 250L, of the Z carriage insertion hole 250. The air pads 260, 262, 264, and 266 are respectively disposed backward, forward, toward the left, and toward the right, to respectively face the front surface 24F, the rear surface 24E, the right side surface 24R, and the left side surface 24L (refer to FIG. 11), of the Z carriage 24.

As illustrated in FIG. 13, near an upper opening of the Z carriage insertion hole 250, a total of the three air pads 260, 262, and 264, are respectively disposed at the front surface 250F, the rear surface 250E, and the right side surface 10R, of the Z carriage insertion hole 250. The air pads 260, 262, and 264, are respectively disposed backward, forward, and toward the left, while respectively facing the front surface 24F, the rear surface 24E, and the right side surface 24R, of the Z carriage 24.

Meanwhile, two air pads 266 and 266 are disposed in the left side surface 250L of the Z carriage insertion hole 250 near the upper opening of the Z carriage insertion hole 250. The air pads 266 and 266 are disposed toward the right to face the left side surface 24L of the Z carriage 24.

According to the support means of the Z carriage 24 formed as described above, when the Z carriage 24 is inserted into the Z carriage insertion hole 250 of the support section 200, the support section 200 supports the Z carriage 24 through the air pads 260, 262, 264, and 266.

Each of the air pads 260, 262, 264, and 266 ejects air to allow the corresponding one of the air pads 260, 262, 264, and 266 in the support section 200 to be slidable with respect to the Z carriage 24. Thus, Z carriage 24 becomes movable in the Z-axis direction.

Subsequently, drive means for the Z carriage 24, in the Z driving mechanism, will be described.

As illustrated in FIGS. 12 to 13, in the front surface 250F of the Z carriage insertion hole 250, there is provided a driving unit 270 that has a structure similar to that of the driving unit 80 in the Y driving mechanism described above, and that includes a motor 272 and a roller 274 (refer to FIG. 13). The driving unit 270 is provided in the front surface 250F of the Z carriage insertion hole 250 such that a rotation axis of the roller 274 is parallel to the X-axis and an outer peripheral surface of the roller 274 is brought into contact with the front surface 24F of the Z carriage 24 at a substantially intermediate position between the two air pads 260 and 260 provided on the front surface 250F of the Z carriage insertion hole 250.

Thus, the Z carriage 24 is moved in the Z-axis direction with respect to the support section 200 by driving the motor 272 of the driving unit 270 to rotate the roller 274.

There is provided an optical linear encoder similar to the linear encoder 110 in the Y driving mechanism described above in the Z carriage 24 and the support section 200, as position detection means for the Z carriage 24 in the Z driving mechanism, a scale in a shape of an elongated plate is provided along the Z-axis direction in the Z carriage 24, and an optical sensor is provided at a position facing the scale in the support section 200.

A cable protection tube 278 illustrated in FIGS. 9 to 13 is a flexible guide member into which a cable is inserted and guided. A cable of the measuring probe 26 attached to a lower end of the Z carriage 24 is disposed to be inserted into the Z carriage 24 and the cable protection tube 278 inside the Z column 22, thereby preventing the cable from interfering with another member.

In the three-dimensional coordinate measurement apparatus 1 configured as described above, an effect of reducing shaking in a direction around the Z axis (yawing direction) and in a direction around the X axis (pitching direction) of the Y carriage 14 will be mainly described.

Figure 14:
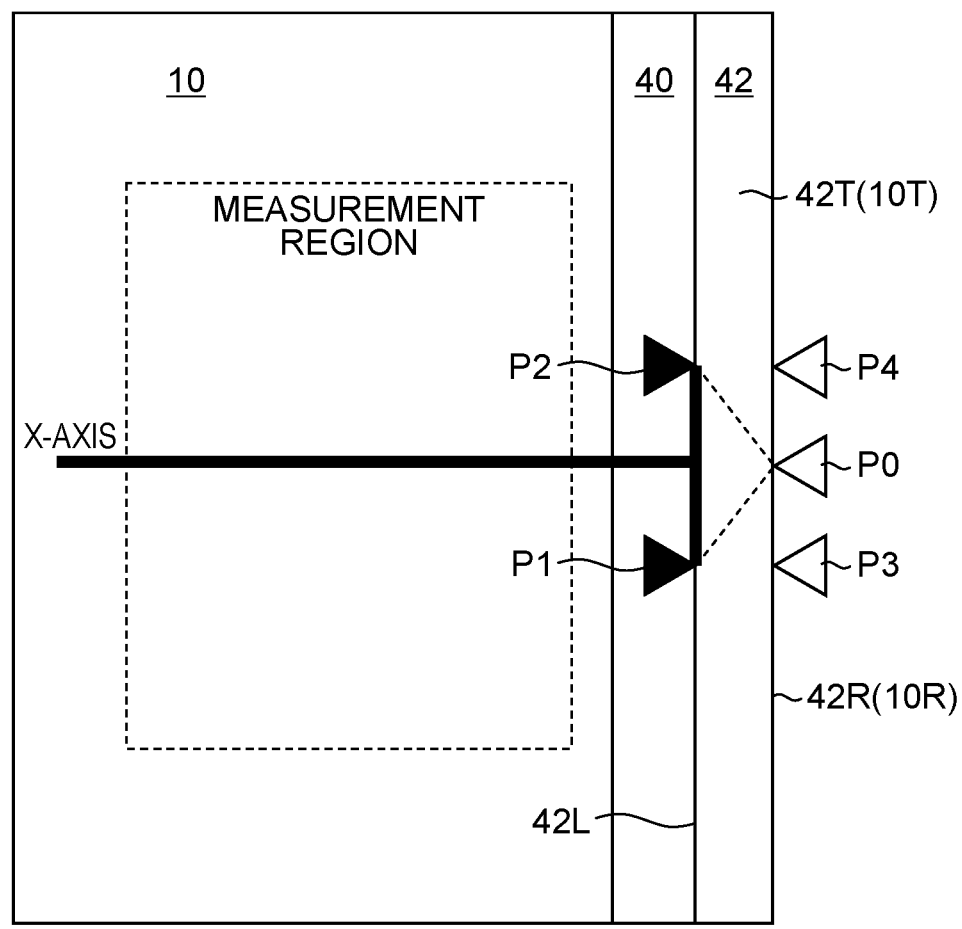
FIG. 14 is a schematic view illustrating a positional relationship of support points at which a Y guide supports the Y carriage as viewed from a top surface side of the surface plate.

FIG. 14 is a schematic diagram illustrating a positional relationship of support points at which the Y guide 42 supports the Y carriage 14 as viewed from a top surface 10T side of the surface plate 10.

In FIG. 14, two back and front support points P1 and P2, existing on the left side surface 42L of the Y guide 42 formed in the surface plate 10, respectively indicate positions at which the air pads 66F and 66E in the Y carriage 14 (support section 50) are brought into contact. Two back and front support points P3 and P4, existing on the right side surface 42R of the Y guide 42, respectively indicate positions at which the air pad 64F and 64E in the Y carriage 14 (support section 50) are brought into contact. A support point P0 existing on the right side surface 42R of the Y guide 42 indicates a position at which the roller 84 of the driving unit 80 provided at the Y carriage 14 (support section 50) is brought into contact (refer to FIG. 6).

The support points P1 and P2 each indicate a fixed support point, and the support points P3 and P4 each indicate an auxiliary support point. That is, the air pads 66F and 66E to be respectively served as the fixed support points P1 and P2 are supported in the support section 50 of the Y carriage 14 so as not to be movable back and forth in a normal direction of the left side surface 42L of the Y guide 42 which serves as a guide surface along which the air pads 66F and 66E slide. Meanwhile, the air pads 64F and 64E to be respectively served as the auxiliary support points P3 and P4 are supported in the support section 50 of the Y carriage 14 so as to be movable back and forth in a normal direction of the right side surface 42R of the Y guide 42 which serves as a guide surface along which the air pads 64F and 64E slide. In addition, the air pads 64F and 64E are urged toward a direction in which the air pads 64F and 64E are brought into contact with the right side surface 42R.

Accordingly, when the roller 84 of the driving unit 80 is pressed against the right side surface 42R of the Y guide 42, the Y guide 42 is allowed to be stable in a state supported by the one support point P0 in the right side surface 42R and the two support points P1 and P2 in the left side surface 42L while the support points P3 and P4 each serve as an auxiliary support point.

Thus, an angle position of the Y carriage 14 in a direction around the Z-axis (yawing direction) is uniquely determined by positions of the support points P1 and P2, whereby shaking in the yawing direction is reduced. Then, due to the reduction in shaking of the X guide 20 (X-axis) in the yawing direction, it is possible to acquire an X coordinate value and a Y coordinate value, which are measured for the measuring object disposed in the measurement region (a region without interference with the Y carriage 14) in the top surface 10T of the surface plate 10, with high accuracy based on a position of the Y guide 42 (left side surface 42L).

Figure 15:
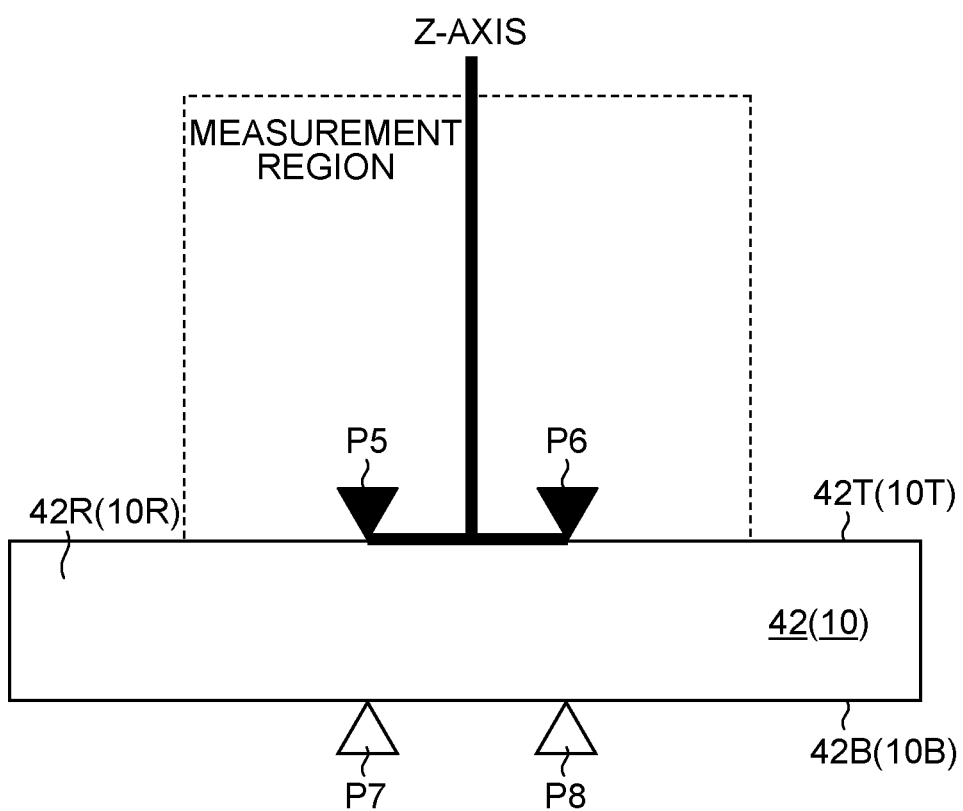
FIG. 15 is a schematic view illustrating a positional relationship of the support points at which the Y guide supports the Y carriage as viewed from the right side surface side of the surface plate (first embodiment).

FIG. 15 is a schematic diagram illustrating a positional relationship between support points at which the Y guide 42 supports the Y carriage 14 as viewed from a right side surface 10R side of the surface plate 10.

In FIG. 15, two back and front support points P5 and P6, existing on the top surface 42T of the Y guide 42 formed in the surface plate 10, respectively indicate positions at which the air pads 62F and 62E in the Y carriage 14 (support section 50) are brought into contact, and two back and front support points P7 and P8, existing on the bottom surface 42B of the Y guide 42, respectively indicate positions at which the air pads 68F and 68E in the Y carriage 14 (support section 50) are brought into contact (refer to FIG. 7).

Accordingly, the Y guide 42 supports the Y carriage 14 at not only the two back and front support points P5 and P6 on the top surface 42T, but also the two back and front support points P7 and P8 on the bottom surface 42B.

Thus, shaking of the Y carriage 14 in the direction around the X axis (pitching direction) is reduced by not only the support points P5 and P6, but also the support points P7 and P8, whereby shaking of the Y carriage 14 in the pitching direction is reduced even if the Y carriage 14 is moved at high speed in the Y-axis direction.

In particular, since the driving unit 80 is disposed between the support points P5 and P6, and the support points P7 and P8, in the Z-axis direction (refer to FIG. 7, etc.), turning force in the pitching direction generated by driving force of the driving unit 80 is also less likely to occur in the Y carriage 14, whereby shaking of the Y carriage 14 in the pitching direction is reduced.

It is desirable that a position of the driving unit 80 in the Y-axis direction is substantially identical to a position, in the Y-axis direction, of the center of gravity of all members (the Y carriage 14 and the Z column 22) that move in the Y-axis direction together with the Y carriage 14.

Then, due to reduction in shaking of the Z carriage 24 (Z-axis) in the pitching direction, it is possible to acquire a Y coordinate value and a Z coordinate value of the measuring object disposed in the measurement region, which are measured by the measuring probe 26, with high accuracy based on a position of the Y guide 42 (top surface 42T).

In addition, since a part of a region along the right side surface 10R of the surface plate 10 serves as the Y guide 42 by forming the groove 40 in the surface plate 10, thermal deformation of the Y guide 42 is less likely to occur as compared with a case where the Y guide 42 is formed by a member separated from the surface plate, whereby moving in a straight line along the Y guide 42 tends to be easily and persistently maintained. Even if compared with a case where both right and left side surfaces of the surface plate 10 are used as a Y guide, a relative variation (displacement amount) in each of the surfaces of the Y guide 42 is small because each of the surfaces of the Y guide 42 is close to each other, whereby moving in a straight line along the Y guide 42 is persistently maintained.

Thus, shaking of the Y carriage 14 in the yawing direction and the pitching direction which are caused by change in position of the Y carriage 14 in the Y-axis direction, is small, whereby moving of the Y carriage 14 in the Y-axis direction is allowed to be persistently stable, and measurement accuracy can be persistently maintained. In addition, as compared with a case where the Y guide 42 is formed by a member separated from the surface plate 10, the Y guide 42 (Y guide mechanism) can be formed in a simple and inexpensive structure.

Since a part of the surface plate 10 serves as the Y guide 42, change in the shape of the Y guide 42 during measurement becomes small as compared with a case where the Y guide 42 is formed by a member separated from the surface plate 10, and thus a measurement error due to curvature of the Y guide 42 or the like can be easily reduced by correction in calculation. The surface plate 10 is not necessarily to be made of stone.

Subsequently, for a three-dimensional coordinate measurement apparatus 1 according to a second embodiment of the present invention, a structure for improving measurement accuracy of a position of the Y carriage 14 in the Y-axis direction (Y coordinate value), or measurement accuracy of a Y coordinate value of the measuring object, will be mainly described. In descriptions related to the second embodiment, a component in common with the first embodiment is designated by the same reference character as that in the first embodiment, and description thereof is omitted.

First, a covering member for covering an upper opening of the groove 40 will be described.

Figure 16:
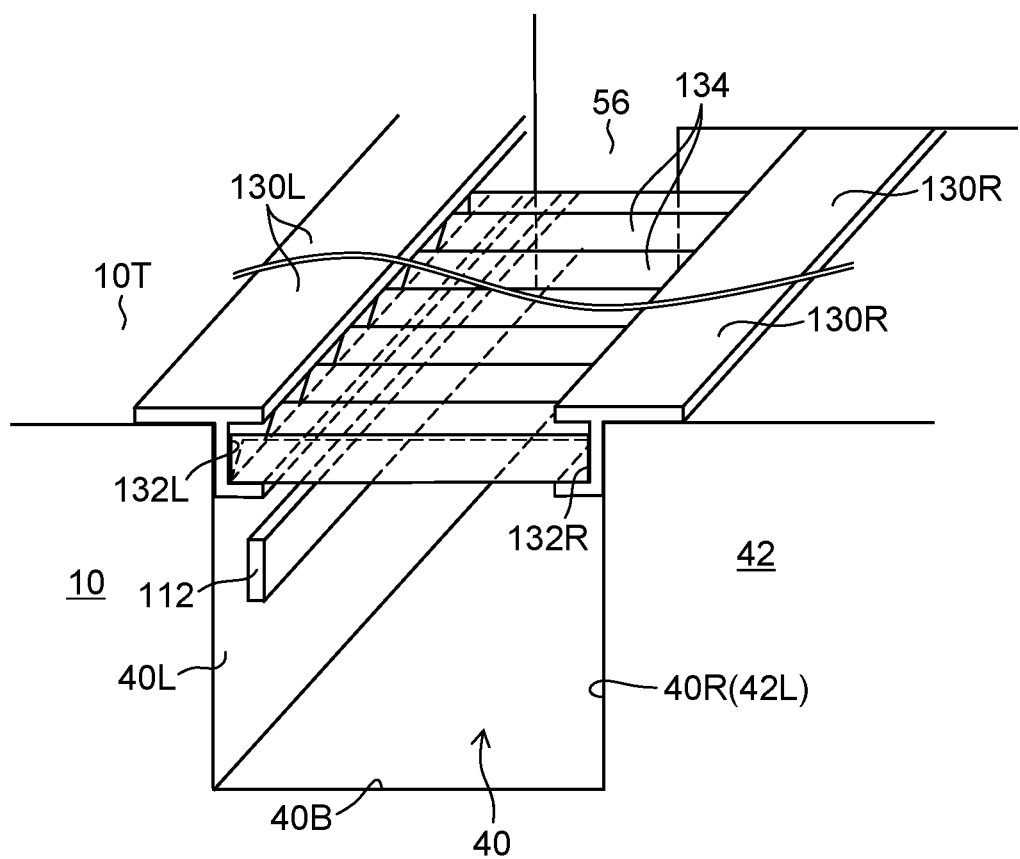
FIG. 16 is a perspective view illustrating a part of the groove of the surface plate in an enlarged manner and a bellows cover (second embodiment).

FIG. 16 is a perspective view illustrating a part of the groove 40 of the surface plate 10 in an enlarged manner.

As illustrated in FIG. 16, a right rail 130R and a left rail 130L are respectively disposed at a right edge part and a left edge part of the upper opening of the groove 40 and fixed to the surface plate 10.

The right rail 130R and the left rail 130L each extend from an end on a front side (front end) of the groove 40 to an end on a rear side (rear end) thereof. The right rail 130R is provided along the right side surface 40R of the groove 40 (the left side surface 42L of the Y guide 42), and the left rail 130L is provided along the left side surface 40L of the groove 40 (refer to FIG. 6).

In addition, the right rail 130R and the left rail 130L have a bilaterally symmetrical shape to each other. The right rail 130R and the left rail 130L are respectively provided with guide grooves 132R and 132L having openings each of which opens sideways (laterally) toward a direction facing each other.

Over the upper opening of the groove 40, an expandable bellows cover 134 is placed. End edge parts on both right and left sides of the bellows cover 134 are respectively fitted into the guide groove 132R of the right rail 130R and the guide groove 132L of the left rail 130L, and supported between them.

Figure 18:
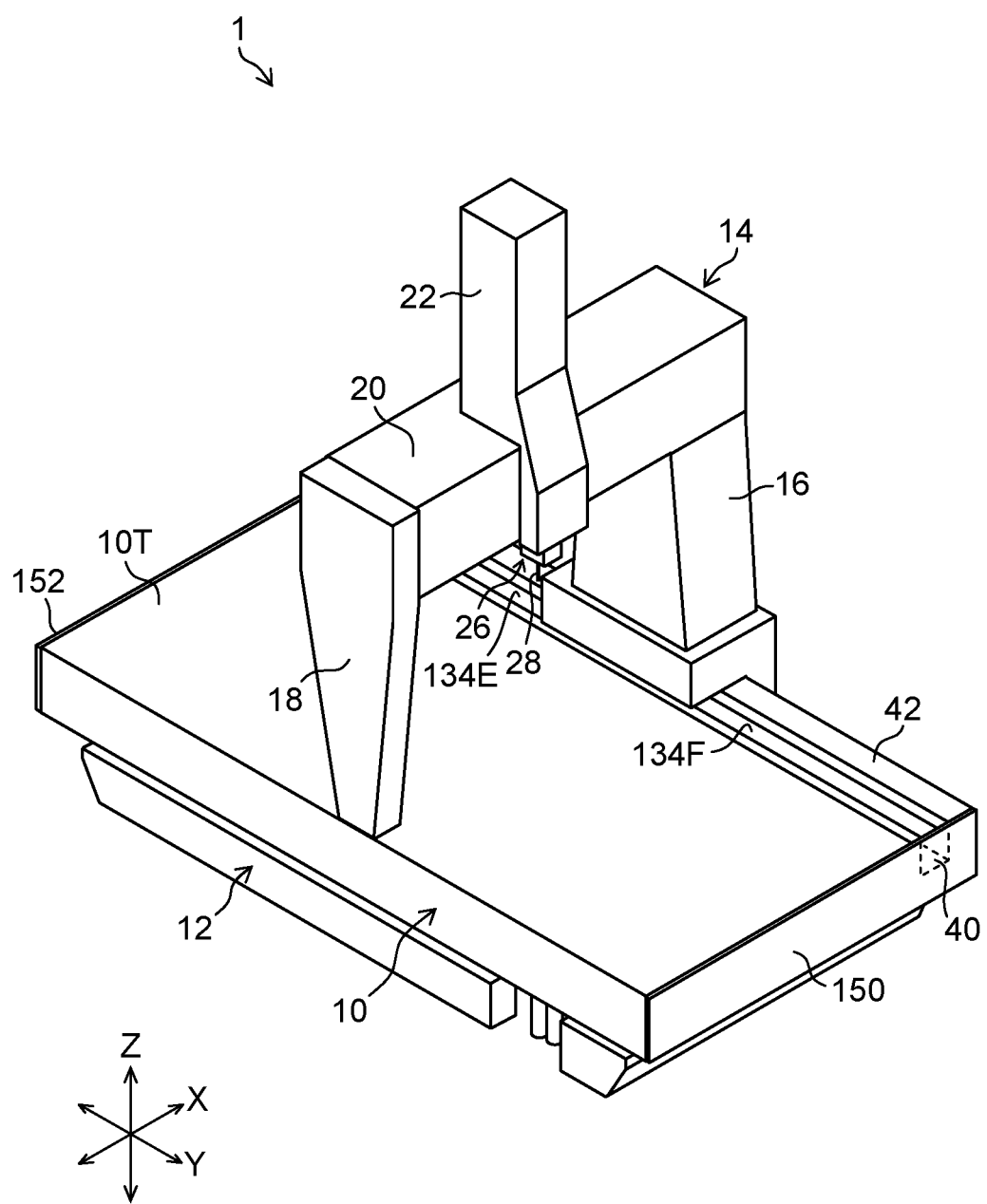
FIG. 18 is a perspective view illustrating an appearance of a three-dimensional coordinate measurement apparatus to which the present invention is applied (third embodiment).

The bellows cover 134 is provided so as to be divided into a bellows cover 134F on a front side and a bellows cover 134E on a rear side across a left side part 56, across the support section 50 in a right Y carriage 16 (refer to FIG. 18). The bellows cover 134F provided on the front side includes a front end that is fixed to the front side surface of the surface plate 10 through a fixing member (not illustrated), such as a covering member for covering the front side surface of the surface plate 10, and a rear end that is fixed to the front surface of the left side part 56 of the support section 50. The bellows cover 134E provided on the rear side includes a front end that is fixed to the rear surface of the left side part 56 of the support section 50, and a rear end that is fixed to the rear side surface of the surface plate 10 through a fixing member (not illustrated), such as a covering member for covering the rear side surface of the surface plate 10.

Accordingly, the upper opening of the groove 40 is covered with the bellows cover 134. Then, as the Y carriage 14 (support section 50) moves in the Y-axis direction, the bellows cover 134 expands and contracts in the Y-axis direction. When the Y carriage 14 moves forward, the bellows cover 134F on the front side contracts and the bellows cover 134E on the rear side expands. When the Y carriage 14 moves backward, the bellows cover 134F on the front side expands and the bellows cover 134E on the rear side contracts. Thus, the upper opening of the groove 40 is always covered with the bellows cover 134 regardless of a position of the Y carriage 14 in the Y-axis direction.

This prevents a scale 112 provided inside the groove 40 from being directly exposed to outside air, and can also suppress change in temperature inside the groove 40, thereby expansion and contraction of the scale 112 due to change in temperature of outside air is prevented.

In addition, dirt, dust, or the like is prevented from entering the inside of the groove 40, and thus it is possible to prevent occurrence of a measurement error due to reading error of a grid scale caused by dirt or the like attached to the scale 112, or occurrence of unstable moving of the Y carriage 14 in the Y-axis direction caused by dirt or the like attached to air pads 66F and 66E disposed inside the groove 40.

Subsequently, for the three-dimensional coordinate measurement apparatus 1 configured as described above, an effect of improving measurement accuracy of a position of the Y carriage 14 in the Y-axis direction (Y coordinate value), that is, measurement accuracy of a Y coordinate value of the measuring object, will be mainly described.

Figure 17:
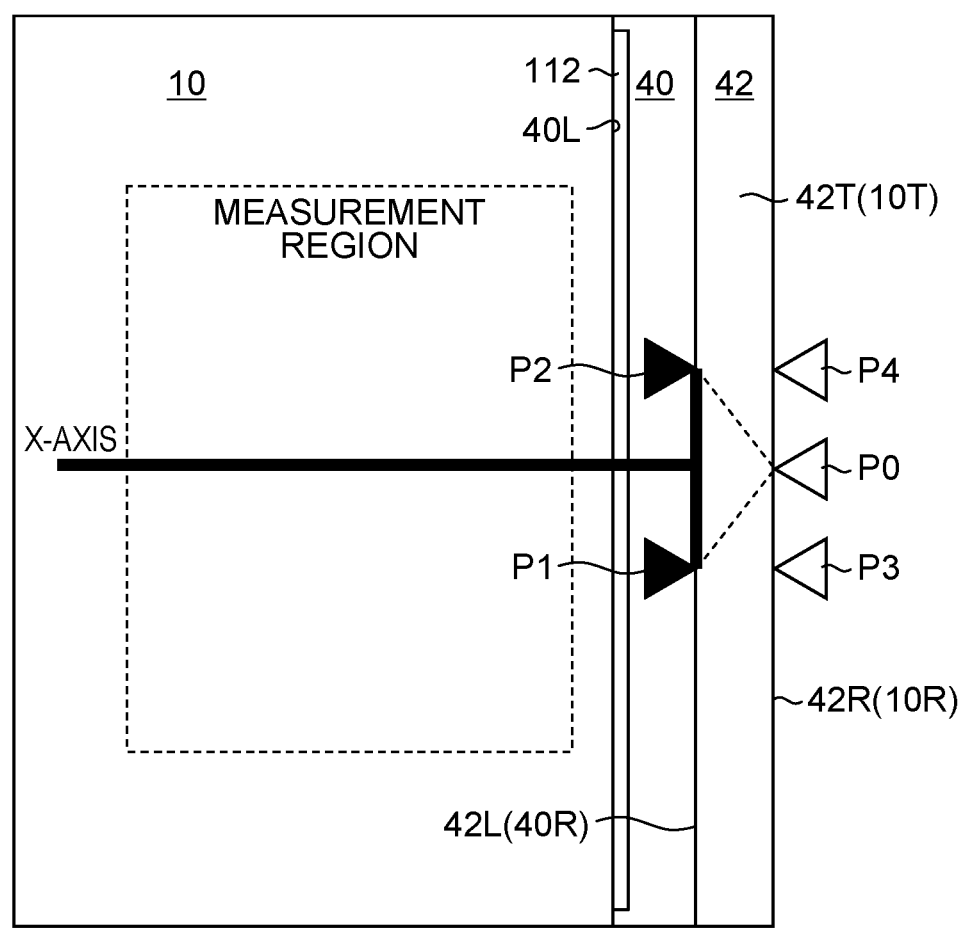
FIG. 17 is a schematic view illustrating a positional relationship among the support points at which the Y guide supports the Y carriage, a scale in a linear encoder, and a measurement region where a measuring object is disposed, as viewed from the top surface side of the surface plate (second embodiment).

FIG. 17 is a schematic diagram illustrating a positional relationship among the support points at which the Y guide 42 supports the Y carriage 14, the scale 112 in a linear encoder 110, and a measurement region where a measuring object is disposed, as viewed from a top surface 10T side of the surface plate 10.

In FIG. 17, two back and front support points P1 and P2 existing on the left side surface 42L of the Y guide 42 formed in the surface plate 10, respectively indicate positions at which the air pads 66F and 66E in the Y carriage 14 (support section 50) are brought into contact. Two back and front support points P3 and P4, existing on a right side surface 42R of the Y guide 42, respectively indicate positions at which air pad 64F and 64E in the Y carriage 14 (support section 50) are brought into contact. A support point P0 (drive point) existing on the right side surface 42R of the Y guide 42 indicates a position at which a roller 84 of a driving unit 80 provided at the Y carriage 14 (support section 50) is brought into contact (refer to FIG. 6).

The support points P1 and P2 each indicate a fixed support point, and the support points P3 and P4 each indicate an auxiliary support point. That is, the air pads 66F and 66E to be respectively served as the fixed support points P1 and P2 are supported in the support section 50 of the Y carriage 14 so as not to be movable back and forth in a normal direction of the left side surface 42L of the Y guide 42 which serves as a guide surface along which the air pads 66F and 66E slide. Meanwhile, the air pads 64F and 64E to be respectively served as the auxiliary support points P3 and P4 are supported by the support section 50 of the Y carriage 14 so as to be movable back and forth in a normal direction of the right side surface 42R of the Y guide 42 which serves as a guide surface along which the air pads 64F and 64E slide. In addition, the air pads 64F and 64E are urged toward a direction in which the air pads 64F and 64E are brought into contact with the right side surface 42R.

As illustrated in FIG. 17, the scale 112 provided in the left side surface 40L of the groove 40 is disposed between the measurement region and the Y guide 42 in which the support points P0 to P4 are provided. That is, the scale 112 is disposed closer to the measurement region than the air pads 64F, 64E, 66F, and 66E, and the driving unit 80, of the Y carriage 14 (right Y carriage 16).

Accordingly, the right Y carriage 16, which is a strut member along a Z-axis direction of the Y carriage 14, does not exist between the measurement region and the scale 112, and thus a distance from the measurement region to the scale 112 is short.

As a result, even if a direction of an X guide 20 of the Y carriage 14 deviates from an X-axis direction due to shaking of the Y carriage 14 in a yawing direction (direction around the Z axis) or the like, a difference between a Y coordinate value of a position at which the stylus 28 of the measuring probe 26 is actually disposed in the measurement region, and a Y coordinate value of the stylus 28 acquired from a Y coordinate value of the Y carriage 14 that are actually measured by the scale 112 (linear encoder 110), is reduced.

Thus, even if shaking in the yawing direction occurs in the Y carriage 14, measurement accuracy of a Y coordinate value of the Y carriage 14, that is, measurement accuracy of a Y coordinate value of the measuring object, can be improved.

When the roller 84 of the driving unit 80 is pressed against the right side surface 42R of the Y guide 42, the Y guide 42 is allowed to be stable in a state where the Y guide 42 is supported by the one support point P0 in the right side surface 42R and the two support points P1 and P2 in the left side surface 42L while the support points P3 and P4 each serve as an auxiliary support point. This forms a structure in which shaking of the Y carriage 14 in the yawing direction is less likely to occur.

Since the scale 112 is provided on the surface plate 10, there is less occurrence of influence of thermal deformation of the Y guide, and of deterioration in measurement accuracy due to instability in the fastening portion between the surface plate and the Y guide, as compared with a case where the scale 112 is provided in a Y guide separated from the surface plate 10, or the like. As a result, high measurement accuracy can be persistently maintained.

Since the scale 112 is disposed inside the surface plate 10 instead of being provided in a peripheral part (a right side surface 10R, a left side surface 10L, etc.) of the surface plate 10, there is less influence of change in temperature of outside air, whereby deterioration in accuracy due to expansion and contraction of the scale 112 is reduced. In particular, the bellows cover 134 is provided over the upper opening of the groove 40 as described above to shield the inside of the groove 40 from outside air. As a result, the scale 112 is prevented from being directly exposed to outside air, and change in temperature inside the groove 40 is also reduced. Thus, expansion and contraction of the scale 112 due to change in temperature of outside air is reliably reduced. As a result, it is not necessarily to use expensive material which cause no expansion and contraction due to temperature change, as the scale 112, and inexpensive material can be used.

While the scale 112 is provided on the left side surface 40L of the groove 40 in the above embodiment, an effect similar to that described above can be acquired by providing the scale 112 along the Y-axis direction in an inner surface of the groove 40 (the right side surface 40R, the bottom surface 40B, or the like, of the groove 40) other than the left side surface 40L.

In addition, while the bellows cover 134 is used as a covering member for covering the upper opening of the groove 40 in the above embodiment, a kind of covering member may be used, instead of a bellows cover. For example, the upper openings of the groove 40 on the front side and the rear side of the lower end part (the left side part 56 of the support section 50) of the Y carriage 14 which is fitted into the groove 40 can be covered with a covering member made of flexible material. The entire upper opening of the groove 40 may be covered with an integrally formed covering member. In addition, the covering member may have an insertion passage, such as a slit, formed along the groove 40 (Y-axis direction), and the insertion passage is configured to insert the lower end part (the left side part 56 of the support section 50) of the Y carriage 14 into the inside of the groove 40 from the outside of the groove 40 and is closed except when the lower end part of the Y carriage 14 is inserted. A configuration without a covering member for covering the upper opening of the groove 40 may be also used.

In the above embodiment, there is described a configuration using an optical linear encoder and a scale, as position detection means for the Y carriage 14 which measures a Y coordinate value of the Y carriage 14, position detection means for the Z column 22, and position detection means for the Z carriage 24. However, the linear encoder and scale are not limited to an optical type, and another kind of linear encoder and scale, such as a magnetism type, can be used.

Subsequently, for a three-dimensional coordinate measurement apparatus 1 according to a third embodiment of the present invention, a structure for reducing deformation of the surface plate due to heat will be mainly described. In descriptions related to the third embodiment, a component in common with the first or second embodiment is designated by the same reference character as that in the first or second embodiment, and a description thereof is not duplicated.

Figure 19:
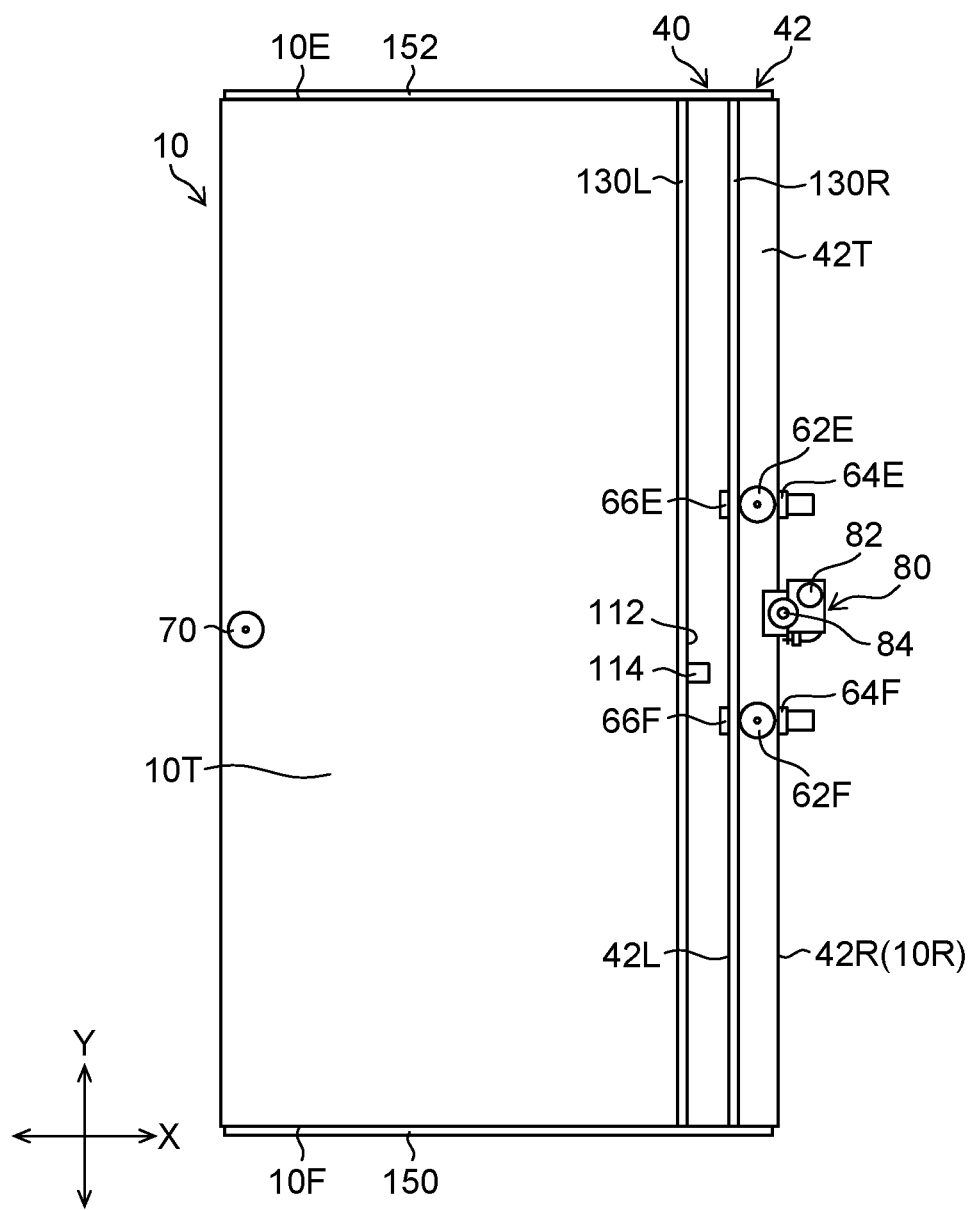
FIG. 19 is a top view illustrating a top surface of a surface plate and an arrangement of air pads provided in a Y carriage with respect to the surface plate (third embodiment).
Figure 20:
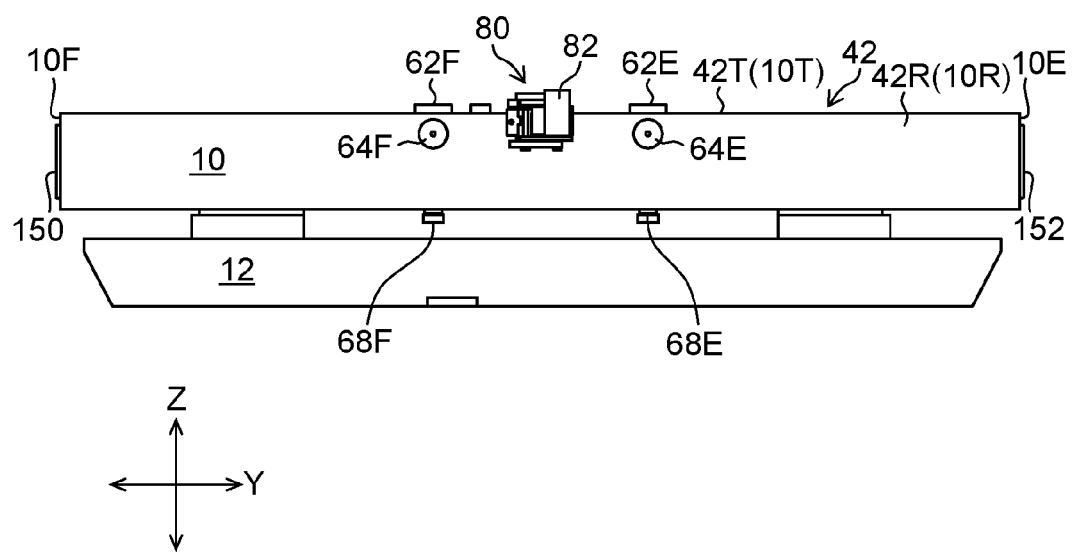
FIG. 20 is a right side view illustrating a right side surface of the surface plate and an arrangement of the air pads provided in the Y carriage with respect to the surface plate (third embodiment).

In the three-dimensional coordinate measurement apparatus 1 according to the present embodiment, a covering member is provided in each of a front side surface 10F and a rear side surface 10E of the surface plate 10 in addition to the structure of the second embodiment. As illustrated in FIGS. 18, 19, and 20, plate-shaped thermal insulation members 150 and 152 are respectively fastened to the front side surface 10F and the rear side surface 10E of the surface plate 10, as covering members for covering substantially whole of the surfaces.

Accordingly, the amount of heat transferring from the front side surface 10F and the rear side surface 10E of the surface plate 10 to the inside of the surface plate 10 or to outside air is reduced. As a result, even if temperature (ambient temperature) of surrounding outside air of the surface plate 10 changes, temperature inside the surface plate 10 is less likely to change, whereby deformation of the surface plate 10 is reduced. In addition, as discussed below, even if the temperature inside the surface plate 10 changes, occurrence of a temperature gradient in a Y-axis direction is reduced. Thus, deterioration in moving in a straightness of the Y carriage 14 is reduced.

In the present embodiment, since the front side surface 10F and the rear side surface 10E of the surface plate 10 are respectively covered with the thermal insulation members 150 and 152, the front side surface 10F and the rear side surface 10E of the surface plate 10 are thermally shielded from outside air. Thus, the amount of heat transferring from the front side surface 10F and the rear side surface 10E of the surface plate 10 to the inside of the surface plate 10 or to outside air is reduced.

Here, a state of deformation of the surface plate 10 will be described on the assumption that the groove 40 is not formed in the surface plate 10 and the thermal insulation members 150 and 152 are not provided in the surface plate 10.

Figure 21:
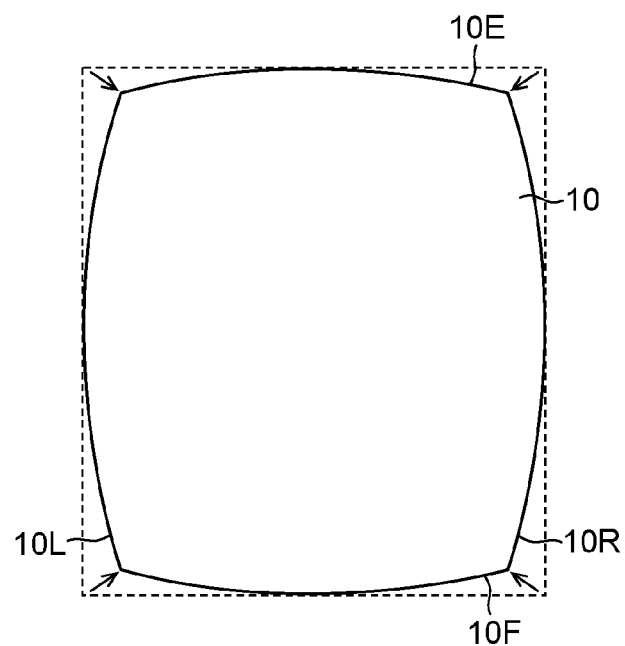
FIG. 21 illustrates a state of shrinkage of the surface plate when ambient temperature decreases.

FIG. 21 illustrates a state of shrinkage of the surface plate 10 when the ambient temperature decreases. When the ambient temperature decreases, a temperature decreases in a peripheral part of the surface plate 10 prior to the inside of the surface plate 10. Thus, during a period after the ambient temperature starts decreasing until the inside of the surface plate 10 becomes stable at a uniform temperature, the surface plate 10 has a temperature distribution in which a central part of the surface plate 10 is higher in temperature than the peripheral part. During the period, the right side surface 10R and the left side surface 10L along the Y-axis direction of the surface plate 10, and the front side surface 10F and the rear side surface 10E along an X-axis direction, become a state where an intermediate part of each of the surfaces expands outward from edges of the corresponding one of the surfaces.

Figure 22:
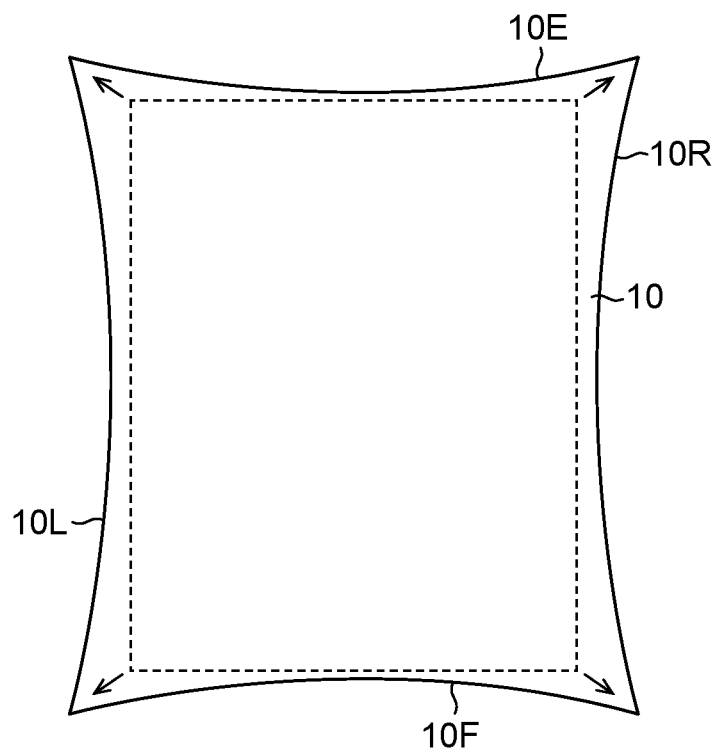
FIG. 22 illustrates a state of expansion of the surface plate when ambient temperature increases.

Conversely, FIG. 22 illustrates a state of expansion of the surface plate 10 when ambient temperature increases. When the ambient temperature increases, a temperature increases in a peripheral part of the surface plate 10 prior to the inside of the surface plate 10. Thus, during a period after the ambient temperature starts increasing until the inside of the surface plate 10 becomes stable at a uniform temperature, thee surface plate 10 has a temperature distribution in which the central part of the surface plate 10 is lower in temperature than the peripheral part. During the period, the right side surface 10R and the left side surface 10L along the Y-axis direction of the surface plate 10, and the front side surface 10F and the rear side surface 10E along the X-axis direction, become a state where the intermediate part of each of the surfaces contracts inward from edges of the corresponding one of the surfaces.

The deformation of the surface plate 10 as described above causes deterioration in straightness of the right side surface 10R and the left side surface 10L along the Y-axis direction. When the Y carriage 14 is moved in the Y-axis direction with respect to the right side surface 10R, shaking in the yawing direction (direction around the Z axis) occurs in the Y carriage 14 and a direction of the X guide 20 of the Y carriage 14 deviates from the X-axis direction. This causes deterioration in measurement accuracy of a Y coordinate value of the Y carriage 14.

In contrast, the surface plate 10 of the present embodiment has the front side surface 10F and the rear side surface 10E that are respectively covered with the thermal insulation members 150 and 152, and thus the amount of heat transferring from the front side surface 10F and the rear side surface 10E of the surface plate 10 to the inside of the surface plate 10 or to outside air is reduced. As a result, change in temperature inside the surface plate 10, caused by decrease or increase in the ambient temperature, is less likely to occur, and even if temperature inside the surface plate 10 changes, occurrence of a temperature gradient in the Y-axis direction is reduced.

Thus, deterioration in straightness of the Y guide 42 in the surface plate 10, or straightness of each of the left side surface 42L, the right side surface 42R, the top surface 42T, and the bottom surface 42B, of the Y guide 42, is reduced regardless of change in the ambient temperature.

In the surface plate 10 of the present embodiment, the measurement region where the measuring object is placed and measured and a region (guide region) of the Y guide 42 where the Y carriage 14 is guided in the Y-axis direction, are discontinuous in the X-axis direction due to the groove 40. As a result, heat conduction between the measurement region and the guide region is suppressed. Thus, heat generated near the guide region (Y guide 42), heat generated by a motor or the like in the driving unit 80 of the Y driving mechanism, heat caused by friction between the Y guide 42 and air pads 62F, 62E, 64F, 64E, 66F, 66E, 68F, and 68E, and the like, are suppressed from transferring to the measurement region through the guide region.

Accordingly, occurrence of change in temperature in the measurement region of the surface plate 10 due to heat generated near the guide region is reduced, and thus deformation of the measurement region of the surface plate 10 is reduced. Even if the temperature in the guide region of the surface plate 10 changes due to the heat and a temperature gradient is caused in the surface plate 10, straightness of the Y guide 42 is hardly affected because a volume of the guide region is small and an amount of deformation in the guide region is also small.

As described above, deformation of the surface plate 10 due to heat is suppressed to suppress deterioration in straightness of the Y guide 42, whereby the Y carriage 14 is accurately moved in the Y-axis direction. This enables measurement with high accuracy that is not affected by heat.

The straightness of the Y guide 42 can be maintained by providing a cover for covering the whole of the region of the Y guide 42, or the whole of the Y guide 42 and the groove 40, along the right side surface 10R of the surface plate 10, so as to prevent the guide region of the surface plate 10 from being affected by change in the ambient temperature. In addition, exhaust means for discharging air in the cover to the outside may be provided to maintain temperature in the cover constant when a temperature in the cover increases due to heat generated by the Y driving mechanism or the like, for example.

Moreover, in each of the above embodiments, the thermal insulation members 150 and 152 are respectively provided in the front side surface 10F and the rear side surface 10E of the surface plate 1; however a thermal insulation member may be provided also in the left side surface 10L of the surface plate 10.

In addition, the three-dimensional coordinate measurement apparatus 1 of each of the above embodiments may be formed by flipping components horizontally, and the groove 40 and the Y guide 42 each may be formed at a position along the left side surface of the surface plate 10 instead of a position along the right side surface 10R of the surface plate 10.

While the above embodiments each show a case where an air pad (air bearing) is used as a support member that is slidably brought into contact with each surface of the Y guide 42 and the like, other kind of support member may be used instead of the air pad. In addition, arrangement of the support member that is slidably brought into contact with each surface of the Y guide 42 and the like, and arrangement of the driving unit 80 can be appropriately changed. The support members (air pads 66F and 66E) disposed inside the groove 40 may be slidably disposed in an inner surface of the groove 40 other than the right side surface 40R of the groove 40.

Operation effects of the three-dimensional coordinate measurement apparatus 1 described above will be supplementarily described below.

In the three-dimensional coordinate measurement apparatus 1 of each of the above embodiments, the roller 84 of the driving unit 80 is disposed such that the axis of the roller 84 is perpendicular to the top surface 10T of the surface plate 10. Thus, the roller 84 is brought into contact with a vertical surface of the surface plate 10. As a result, adhesion of dirt to the roller 84 is prevented to enable measurement to be accurately performed with respect to the side surface of the surface plate 10.

The roller 84 is driven along the side surface (right side surface 10R) of the surface plate 10. Thus, even if the surface plate 10 slightly deforms, measurement can be performed with respect to the surface plate 10. If the roller 84 moves along a rail separated from the surface plate 10, movement of the roller 84 does not synchronize with deformation of the surface plate 10 due to another cause such as thermal expansion of the rail.

The air pads 64F, 64E, 66F, and 66E each are also vertically disposed along the side surface of the surface plate 10. Thus, a position of each of the air pads is set with respect to the surface plate 10, as with the description above. In addition, when the Y carriage 14 is moved, it is possible to reduce a yawing error caused by horizontal shaking of the Y carriage 14 with respect to a direction of the movement of the Y carriage 14.

The roller 84 of the driving unit 80 disposed vertically is arranged so as to be placed between the air pads 66F and 66E that are also disposed vertically. Thus, even if driven rapidly, a yawing error and vibration of the Y carriage 14 can be reduced without changing its posture because the air pads are disposed back and forth across the roller 84.

In addition, a distance (interval) between the support point P1 and the support point P2 in the Y carriage 14 is sufficiently larger than a distance (interval) between each of the support point P1 and P2, and the drive point P0. Thus, vibration of the Y carriage 14 can be reduced, and a yawing error caused by horizontal shaking of the Y carriage 14 with respect to the movement direction of the Y carriage 14 can be reduced.

The air pads 66F and 66E each are disposed so as to be perpendicular to the side surface of the groove 40 of the surface plate 10. Thus, forming the groove 40 in the surface plate 10 and setting the support points P1 and P2 using respectively the air pads 66F and 66E in the side surface of the groove 40 of the surface plate 10 enable to perform measurement with reference to the surface plate 10 while following to deformation such as thermal expansion of the surface plate 10.

The air pads 66F and 66E which respectively face the support points P3 and P4 by the air pads 64F and 64E exist as the support points P1 and P2, respectively, in the side surface of the groove 40 of the surface plate 10, and the Y carriage 14 is supported by the Y guide 42 using the air pads. Accordingly, while supported with respect to the side surface of the surface plate 10, the Y carriage 14 is supported only on its driving side (a right Y carriage 16 side on which the driving unit 80 is disposed) with respect to the driven side (left Y carriage 18 side). As a result, sliding friction on the driven side becomes a negligible level to greatly reduce a yawing error.

On the driven side of the Y carriage 14, only the air pad 70 toward the Z-axis direction is disposed, and there is no air pad restraining the movement in the Y-axis direction. Thus, the movement of the Y carriage 14 in the Y-axis direction follows the movement on the driving side without generating unnecessary resistance on the driven side. As a result, vibration can be reduced to reduce yawing.

A position in the Y-axis direction of the air pad 70 toward the Z-axis direction on the driven side of the X guide 20 and the left Y carriage 18 exists between the air pads 66F and 66E (support points P1 and P2) or the air pads 64F and 64E (support points P3 and P4), on the driving side with respect to the left Y carriage 18. Thus, even under rapid acceleration and deceleration, the left Y carriage 18 receives only moment of the X guide 20 and a measurement section in a width between the support points P1 and P2 (or the support points P3 and P4), and there is little sliding friction. As a result, vibration and a yawing error become very small.

Subsequently, in comparison between the three-dimensional coordinate measurement apparatus 1 of the present embodiment and a three-dimensional coordinate measurement apparatus of each of comparative examples 1 to 3, operation effects of the three-dimensional coordinate measurement apparatus 1 of the present embodiment will be described in more detail. However, the present invention is not limited to the operation effects described below.

Figure 23:
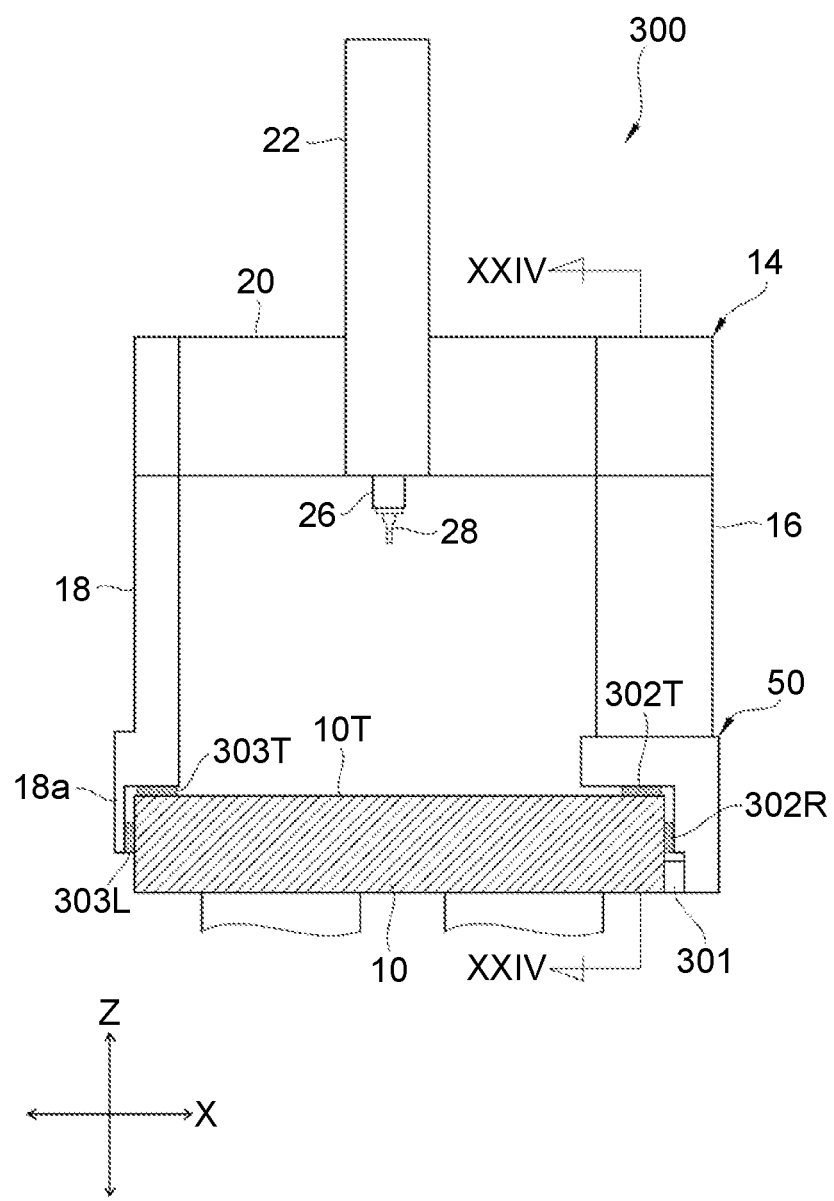
FIG. 23 is a front view (front schematic view) illustrating an appearance of a three-dimensional coordinate measurement apparatus of a comparative example 1.
Figure 24:
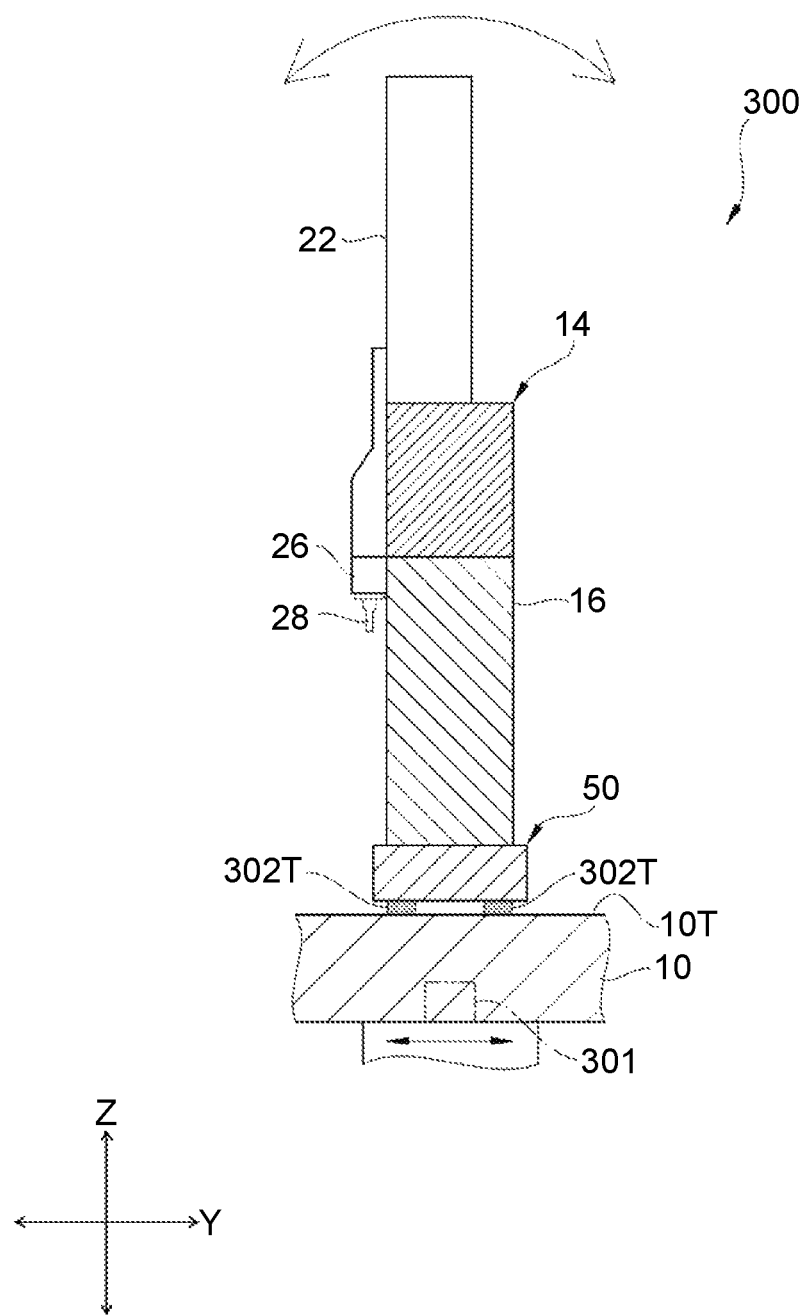
FIG. 24 is a sectional view (schematic sectional view) taken along a line XXIV-XXIV in FIG. 23.

FIG. 23 is a front view (front schematic view) illustrating an appearance of a three-dimensional coordinate measurement apparatus 300 of a comparative example 1 disclosed in Japanese Patent Application Laid-Open No. 5-312556. FIG. 24 is a sectional view (schematic sectional view) taken along a line XXIV-XXIV in FIG. 23. In the three-dimensional coordinate measurement apparatus 300 of the comparative example 1, the same component in function and structure as that of the three-dimensional coordinate measurement apparatus 1 of the present embodiment is designated by the same reference numeral, and a description thereof is not duplicated.

As illustrated in FIGS. 23 and 24, in the three-dimensional coordinate measurement apparatus 300 of the comparative example 1, a support section 50 supporting a right Y carriage 16 on a side directly driven by a driving unit 301 (hereinafter abbreviated as a driving side) is supported by a surface plate 10 through air pads 302R and 302T. The air pad 302R is disposed on a right side surface of the surface plate 10, and the air pad 302T is disposed on a right end side a top surface 10T of the surface plate 10. In addition, the air pad 302T is provided at each of two places along a Y direction (refer to FIG. 24).

Meanwhile, in the three-dimensional coordinate measurement apparatus 300 of the comparative example 1, a left Y carriage 18 on a driven side which moves in the Y direction by following the right Y carriage 16 on the driving side (hereinafter abbreviated as a driven side) is slidably supported by the top surface 10T of the surface plate 10 through air pads 303T and 303L. The air pad 303T is disposed on the top surface 10T of the surface plate 10. The left Y carriage 18 is provided at its lower end with a support section 18a facing a left side surface of the surface plate 10, and the air pad 303T is disposed on the left side surface of the surface plate 10 by the support section 18a.

The driving unit 301 is configured to be essentially identical to the driving unit 80 of the present embodiment, for example, and is provided near the air pad 302R. A rectangular frame illustrated by a two-dot chain line in FIG. 24 shows a position of the driving unit 301.

In the three-dimensional coordinate measurement apparatus 300 of the comparative example 1, the air pads 302R and 303L are disposed in both respective side surfaces (vertical surfaces on both sides) of the surface plate 10 in FIG. 23. In this case, it appears that the Y carriage 14 is to be stable when moving back and forth in the Y direction, at first sight. However, a yawing error becomes large when the Y carriage 14 moves back and forth in the Y direction.

That is, when the air pads 302R and 303L are disposed in both the respective side surfaces of the surface plate 10, a side for controlling primary drive operation and a side for following the operation are not clearly distinguished between the right Y carriage 16 on the driving side and the left Y carriage 18 on the driven side, and thus both the sides have similar sliding friction. As a result, when the Y carriage 14 is moved in the Y direction, a positional relationship between the right Y carriage 16 and the left Y carriage 18 in the Y direction does not become constant, and thus the Y carriage 14 oscillates around the Z-axis to cause a yawing error to become large, for example. Thus, as in the present embodiment, if the right Y carriage 16 on the driving side is configured to move along the Y guide 42 (refer to FIG. 3) so as to reduce sliding friction of the left Y carriage 18 on the driven side as much as possible, oscillation around the Z-axis described above does not occur because the left Y carriage 18 moves by following the right Y carriage 16 on the driving side.

In addition, in the three-dimensional coordinate measurement apparatus 300 of the comparative example 1, the driving unit 301 is not disposed near the air pad 303L on the driven side. Further, the air pad 303L on the driven side is positioned on an opposite side to the air pad 302R on the driving side across the Y carriage 14, and the air pads 303L and 302R are pressed together against both the corresponding side surfaces of the surface plate 10. In this case, the air pad 303L on the driven side is positioned at a place which is on an opposite side of the surface plate 10 and is away from the driving unit 301. Therefore, sliding between the air pad 303L and the left side surface of the surface plate 10 causes large rotation moment with (using) the driving unit 301 as a fulcrum.

When the air pads 302R and 303L are moved in a direction perpendicular to a pressing force direction of the surface plate 10 (Y direction) while both the side surfaces of the surface plate 10 are pressed by the corresponding air pads 302R and 303L across the surface plate 10, a balance between sliding friction of both the air pads 302R and 303L slightly changes during the movement operation. Associated with the change in the balance, a yawing error is greatly deteriorated.

As a method of reducing this kind of yawing error, Japanese Patent Application Laid-Open No. 7-218247 discloses a driving unit that is provided with a specific structure capable of preventing a Y carriage 14 from twisting and bending even if the Y carriage 14 is moved in a Y direction with large acceleration, for example. Unfortunately, if the driving unit with the specific structure is used, there is a problem in that a three-dimensional coordinate measurement apparatus 300 is increased in size, and the structure of the driving unit is complicated. Thus, the three-dimensional coordinate measurement apparatus 300 of the comparative example 1 has a problem in that a yawing error occurs during movement of the Y carriage 14.

In addition, while the two air pads 302T are disposed on a right end side of the top surface 10T of the surface plate 10 along the Y direction in the three-dimensional coordinate measurement apparatus 300 of the comparative example 1, no air pad is disposed on a bottom surface side of the surface plate 10. This is one of the differences from the configuration of the three-dimensional coordinate measurement apparatus 1 of the present embodiment illustrated in FIG. 7 described above. That is, the three-dimensional coordinate measurement apparatus 300 of the comparative example 1 includes no air pad facing a bottom surface of the surface plate 10 or of a Y guide (not illustrated) provided in the surface plate 10, and thus a position of the right Y carriage 16 on the driving side in the vertical direction (Z-axis direction) is determined by only the top surface of the surface plate 10. This causes a problem of a pitching error along with a yawing error in the three-dimensional coordinate measurement apparatus 300 of the comparative example 1.

To reduce the pitching error, a positional relationship between the driving unit 301 for driving the right Y carriage 16 in the Y direction, and an air pad supporting the right Y carriage 16, is important. For example, since the three-dimensional coordinate measurement apparatus 300 of the comparative example 1 includes the driving unit 301 that is provided below the top surface 10T of the surface plate 10, the right Y carriage 16 is instantaneously tilted (oscillated) around the X-axis with respect to the top surface 10T of the surface plate 10. Thus, when the right Y carriage 16 on the driving side is simply supported only on the surface plate 10 like the three-dimensional coordinate measurement apparatus 300 of the comparative example 1, a support point of the right Y carriage 16 is one point in the vertical direction, whereby rotation moment acts with respect to the support point on the surface plate 10 during driving by the driving unit 301. As a result, the right Y carriage 16 oscillates around the X-axis and a pitching error is worsened.

When the Y carriage 14 (right Y carriage 16) is simply supported only on the surface plate 10, the pitching error caused when the Y carriage 14 is driven affects also the yawing error. That is, when the pitching error occurs, one of the back and forth air pads 302T in the Y direction is away from the top surface 10T the surface plate 10, and the other approaches the top surface 10T. At the time, it is better that the right Y carriage 16 and the left Y carriage 18 are asymmetrical in structure and sliding friction of the right Y carriage 16 on the driving side is more than that of the left Y carriage 18 on the driven side. However, a balance between sliding friction in the right and that in the left cannot be kept due to change in sliding friction caused by the pitching error because there is the asymmetry as described above. This causes the Y carriage 14 to be further deformed so as to be twisted. As a result, this may cause the yawing error to be worse.

Moreover, when the air pads 302T are disposed on the top surface side of the surface plate 10 and no air pad is disposed on the bottom surface side of the surface plate 10 as in the three-dimensional coordinate measurement apparatus 300 of the comparative example 1, a load of the Y carriage 14 is substantially equally divided into both the right Y carriage 16 on the driving side and the left Y carriage 18 on the driven side. When a half of a weight of the Y carriage 14 is applied to the driven side, sliding friction of the left Y carriage 18 on the driven side increases by the weight. As a result, the yawing error becomes large.

To reduce the pitching error, it is required that the top and bottom surfaces of the surface plate 10 are clamped (pinched, gripped or held) between the air pads 62E, 62F, 68E, and 68F (refer to FIG. 7), and the driving unit 80 (refer to FIG. 7) is provided between the top and bottom surfaces of the surface plate 10, as in the three-dimensional coordinate measurement apparatus 1 of the present embodiment. As a result, when the Y carriage 14 (right Y carriage 16) is moved in the Y direction, both the top and bottom surfaces of the surface plate 10 serve as support points of the right Y carriage 16, and the driving unit 80 is positioned at a position interposed between the two support points. Accordingly, the pitching error of the Y carriage 14 is less likely to occur even during acceleration or deceleration. Here, to reduce a pitching error during acceleration or deceleration, it is preferable that the driving unit 80 is disposed at a position of the center of gravity of the Y carriage 14 (right Y carriage 16) in the Y direction. For example, it is preferable that the driving unit 80 is disposed at the center position between the air pads 62E and 62F.

In the three-dimensional coordinate measurement apparatus 300 of the comparative example 1, no air pad is provided on the bottom surface of the surface plate 10, and the right Y carriage 16 is supported at only one point in the vertical direction. As a result, not only the pitching error around the X-axis, but also oscillation of the right Y carriage 16 around the Y-axis, that is, a rolling error, may occur.

When this kind of rolling error occurs, a balance between sliding friction in the right and that in the left also cannot be kept, as with a case where a pitching error occurs. Accordingly, this may cause the yawing error to be worse.

In contrast, the right Y carriage 16 of the three-dimensional coordinate measurement apparatus 1 of the present embodiment is vertically restricted and supported by being pressed from not only the top surface side of the surface plate 10, but also the bottom surface side thereof, using the corresponding air pads 62E, 62F, 68E, and 68F (refer to FIG. 7). Thus, sliding friction of the right Y carriage 16 on the driving side increases, but sliding friction of the left Y carriage 18 on the driven side can be accordingly reduced to a relatively low level. At this time, because the surface plate 10 is clamped (held, gripped or pinched) in the vertical direction in the right Y carriage 16 on the driving side, it is possible to correct tilting (oscillation) of the Y carriage 14 in back and forth direction in the Y direction, as well as to support a weight applied to the Y carriage 14 almost by the driving side part.

The left Y carriage 18 on the driven side of the three-dimensional coordinate measurement apparatus 1 of the present embodiment serves to simply support the Y carriage 14 with respect to the top surface 10T of the surface plate 10 to eliminate a rolling error around the right Y carriage 16 on the driving side. Thus, while the right Y carriage 16 on the driving side rolls with respect to the surface plate 10 to support the Y carriage 14, the left Y carriage 18 on the driven side can be lightly supported only on the top surface 10T of the surface plate 10 at a level to mitigate the rolling error of the Y carriage 14. As a result, sliding friction does not occur in the left Y carriage 18 on the driven side, and thus, the speed is controlled (limited) by sliding friction in the right Y carriage 16 on the driving side. Therefore, the yawing error can be reduced to a low level.

Figure 25:
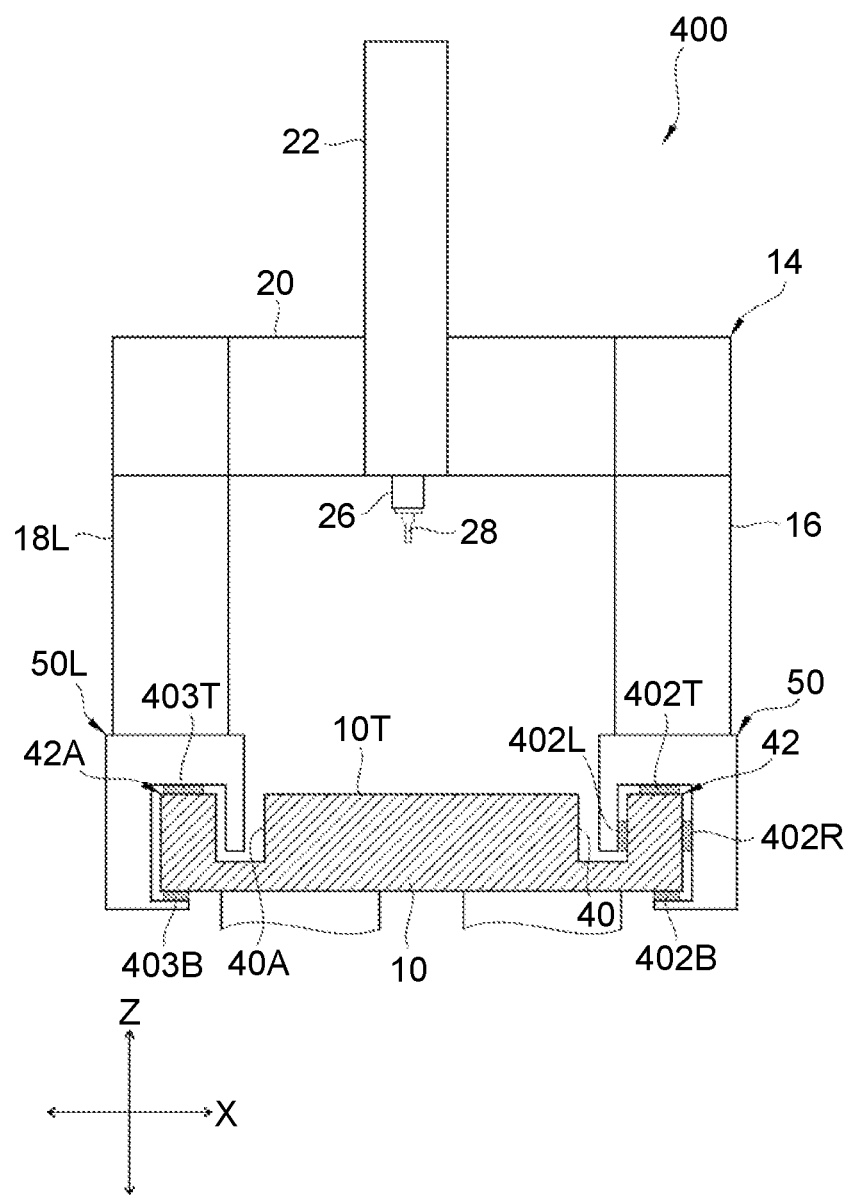
FIG. 25 is a front view (front schematic view) illustrating an appearance of a three-dimensional coordinate measurement apparatus of a comparative example 2.

FIG. 25 is a front view (front schematic view) illustrating an appearance of a three-dimensional coordinate measurement apparatus 400 of a comparative example 2 disclosed in Japanese Patent Application Laid-Open No. 64-035310, and Japanese Patent Application Laid-Open No. 62-235502. In the three-dimensional coordinate measurement apparatus 400 of the comparative example 2, the same component in function and structure as that of the three-dimensional coordinate measurement apparatus 1 of the present embodiment is designated by the same reference numeral, and a description thereof is not duplicated.

As illustrated in FIG. 25, in the three-dimensional coordinate measurement apparatus 400 of the comparative example 2, the support section 50 supporting a right Y carriage 16 on the driving side (an illustration of a driving unit is eliminated) is supported by the Y guide 42 (surface plate 10) through air pads 402R, 402T, 402L, and 402B. The air pad 402R is disposed on a right side surface of the Y guide 42 of the surface plate 10, the air pad 402T is disposed on a top surface side of the Y guide 42, the air pad 402L is disposed on the left side surface of the Y guide 42, and the air pad 402B is disposed on the bottom surface side of the Y guide 42.

The three-dimensional coordinate measurement apparatus 400 of the comparative example 2 includes the left Y carriage 18L on the driven side that move in the Y direction by following the right Y carriage 16 on the driving side, and the support section 50L for the left Y carriage 18L. Each of a set of the left Y carriage 18L on the driven side and the support section 50L, and a set of the right Y carriage 16 on the driving side and the support section 50, has a bilaterally symmetrical shape.

The groove 40A and the Y guide 42A are formed on a left end side of a top surface 10T of the surface plate 10. Each of a set of the groove 40A and the Y guide 42A, and a set of the groove 40 and the Y guide 42, has a bilaterally symmetrical shape. The support section 50L described above is supported by the Y guide 42A along the Y direction in a movable manner.

The support section 50L on the driven side is supported by the Y guide 42A (surface plate 10) through the air pads 403T and 403B. The air pad 403T is disposed on the top surface side of the Y guide 42A, and the air pad 403B is disposed on the bottom surface side of the Y guide 42A. The three-dimensional coordinate measurement apparatus 400 of the comparative example 2 may further include an air pad disposed on a left surface side of the Y guide 42A.

When the air pads 403T and 403B are respectively disposed on the top and bottom surfaces of the Y guide 42A in the left Y carriage 18L on the driven side, as with the right Y carriage 16 on the driving side, sliding friction increases in both the right Y carriage 16 on the driving side and the left Y carriage 18L on the driven side. As a result, when the Y carriage 14 is moved in the Y direction, a positional relationship between the right Y carriage 16 and the left Y carriage 18L in the Y direction does not become constant, and thus the Y carriage 14 may oscillate around the Z-axis to cause the yawing error to become large, for example, also in the three-dimensional coordinate measurement apparatus 400 of the comparative example 2, as with the comparative example 1 described above.

Thus, to reduce the yawing error, it is preferable that a side for controlling primary drive operation, and a side following the operation, are clearly distinguished, as in the three-dimensional coordinate measurement apparatus 1 of the present embodiment. That is, it is preferable that while the right Y carriage 16 on the driving side is configured to move along the Y guide 42 as much as possible by increasing sliding friction, the left Y carriage 18 on the driven side is configured to be supported by minimum force so as to follow the driving side without resisting the movement of the driving side.

Figure 26:
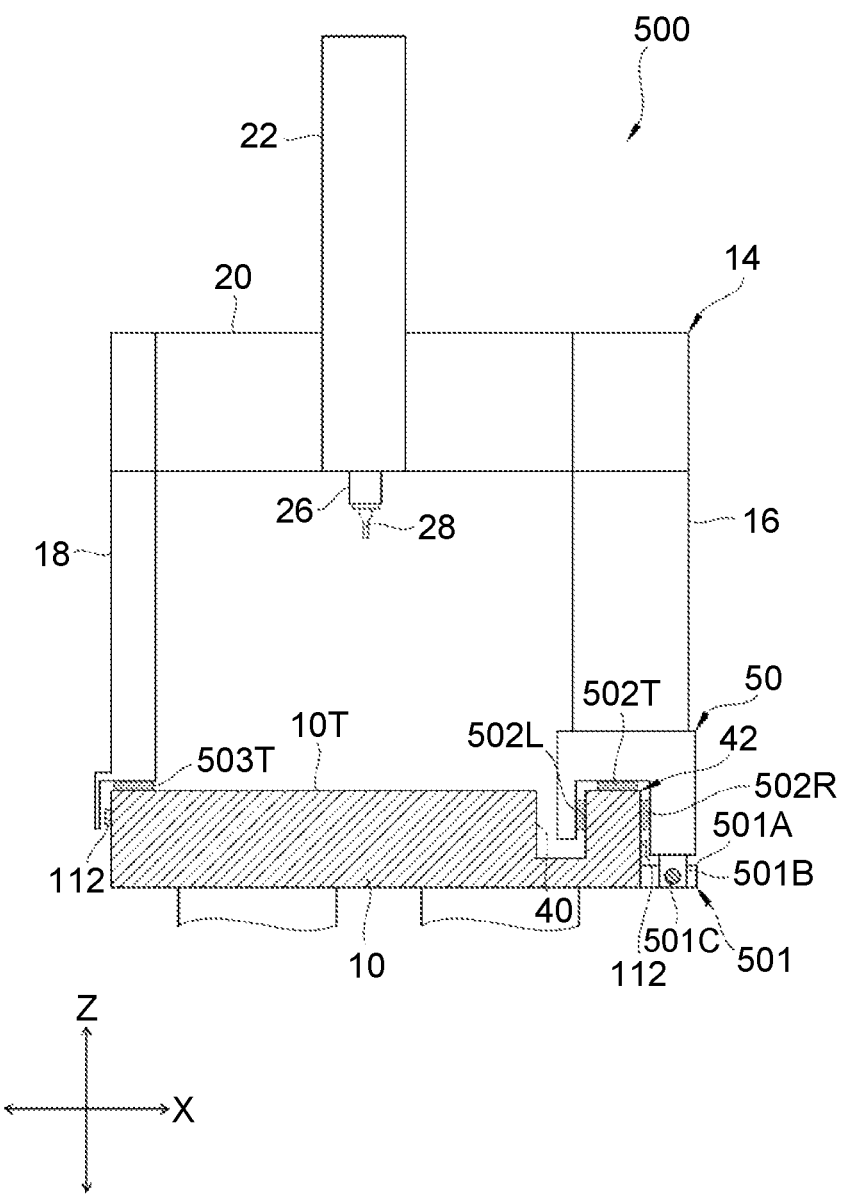
FIG. 26 is a front view (front schematic view) illustrating an appearance of a three-dimensional coordinate measurement apparatus of a comparative example 3.

FIG. 26 is a front view (front schematic view) illustrating an appearance of a three-dimensional coordinate measurement apparatus 500 of a comparative example 3. In the three-dimensional coordinate measurement apparatus 500 of the comparative example 3, the same component in function and structure as that of the three-dimensional coordinate measurement apparatus 1 of the present embodiment is designated by the same reference numeral, and a description thereof is not duplicated.

As illustrated in FIG. 26, the support section 50 which supports the right Y carriage 16 on the driving side being driven in the Y direction by a driving unit 501, is supported by the Y guide 42 (surface plate 10) through air pads 502R and 502T. The air pads 502R are disposed on the right side surface of the Y guide 42 of the surface plate 10, the air pads 502T are disposed on a top surface side of the Y guide 42, and the air pads 502L are disposed on the left side surface of the Y guide 42. The air pads 502R, air pads 502T, and air pads 502L, each are provided at corresponding two places along the Y direction.

In the three-dimensional coordinate measurement apparatus 500 of the comparative example 3, the left Y carriage 18 on the driven side which moves in the Y direction by following the right Y carriage 16 on the driving side is slidably supported by the top surface 10T of the surface plate 10, through an air pad 503T.

The driving unit 501 is a shaft-type linear motor provided on the right side surface of the Y guide 42 (surface plate 10). The driving unit 501 includes a movable element 501B of the shaft-type linear motor attached to the support section 50, a stator (shaft) 501C disposed parallel to the Y direction, and a fixed part 501A for fixing opposite ends of the stator 501C to the right side surface of the Y guide 42.

In the three-dimensional coordinate measurement apparatus 500 of the comparative example 3, a scale 112 is provided on each of the right side surface of the Y guide 42 and the left side surface of the surface plate 10.

In the three-dimensional coordinate measurement apparatus 500 of the comparative example 3, no air pad facing the bottom surface of the surface plate 10 is provided, as with the comparative example 1 described above. Therefore, the right Y carriage 16 may oscillate around the X-axis and the pitching error may be worsened. As described in the comparative example 1 described above, a balance between sliding friction in the right Y carriage 16 and that in the left Y carriage 18 cannot be kept due to change in sliding friction caused by the pitching error, and a load of the Y carriage 14 is substantially equally divided into both the right Y carriage 16 and the left Y carriage 18. As a result, the yawing error may be worsened. Thus, to reduce the pitching error and the yawing error, it is preferable that the top and bottom surfaces of the surface plate 10 are clamped (held, gripped or pinched) between the air pads 62E, 62F, 68E, and 68F, and the driving unit 80 is provided between the top and bottom surfaces of the surface plate 10, as in the three-dimensional coordinate measurement apparatus 1 of the present embodiment.

In addition, in the three-dimensional coordinate measurement apparatus 500 of the comparative example 3, the fixed part 501A and the stator 501C which are constituting the driving unit 501 of a shaft-type linear motor, are provided in the right side surface of the Y guide 42 (surface plate 10). When the fixed part 501A and the stator 501C are provided in the right side surface of the Y guide 42 (surface plate 10) as described above, a placement error of the fixed part 501A and the stator 501C with respect to the surface plate 10 may occur, or a bimetallic effect caused by a difference between thermal expansion coefficients of respective components may cause distortion in the fixed part 501A and the stator 501C. In this case, it is difficult to acquire measurement accuracy with respect to the surface plate 10. Thus, it is preferable that there is provided the driving unit 80 with the roller 84 that is brought into contact with the right side surface of the Y guide 42 (surface plate 10), as in the three-dimensional coordinate measurement apparatus 1 of the present embodiment.

Further, in the three-dimensional coordinate measurement apparatus 500 of the comparative example 3, the scale 112 is provided on each of the right side surface of the Y guide 42 and the left side surface of the surface plate 10, and thus a distance between a measurement region where a measuring object is disposed on the top surface 10T of the surface plate 10 and the scale 112 increases. As a result, a difference between a Y coordinate value of a position at which the gauge head of the stylus 28 is actually disposed, and a Y coordinate value of the gauge head acquired from a Y coordinate value of the Y carriage 14 that is actually measured by the scale 112, increases. In addition, shaking of the Y carriage 14 in a yawing direction, or the like, is likely to cause deterioration in measurement accuracy of the Y coordinate value of the Y carriage 14. Further, when the scale 112 is provided at a peripheral part of the surface plate 10, the scale 112 tends to be affected by ambient temperature because the scale 112 is close to outside air, and an error due to expansion and contraction of the scale 112 itself also tends to occur.

Thus, it is preferable that the scale 112 is provided on the left side surface 40L (refer to FIG. 3) of the groove 40 to reduce the distance between the measurement region, where a measuring object is disposed on the top surface 10T of the surface plate 10, and the scale 112, as in the three-dimensional coordinate measurement apparatus 1 of the present embodiment. That is, it is preferable that the left Y carriage 18 on the driven side, the measurement region, the scale 112, and the right Y carriage 16 on the driving side (driving unit 80) are disposed in the order listed above. Even if there is a yawing error, the yawing error can be minimized by providing the scale 112 at a place that is on the driving side (right Y carriage 16 side) and is near the measurement region, as described above. When the scale is provided on the left side surface 40L perpendicular to the top surface 10T, even if dirt or dust drops from above the surface plate 10, it is not attached on the scale 112, whereby there is no malfunction in scale 112 reading due to dirt or dust.

Figure 27:
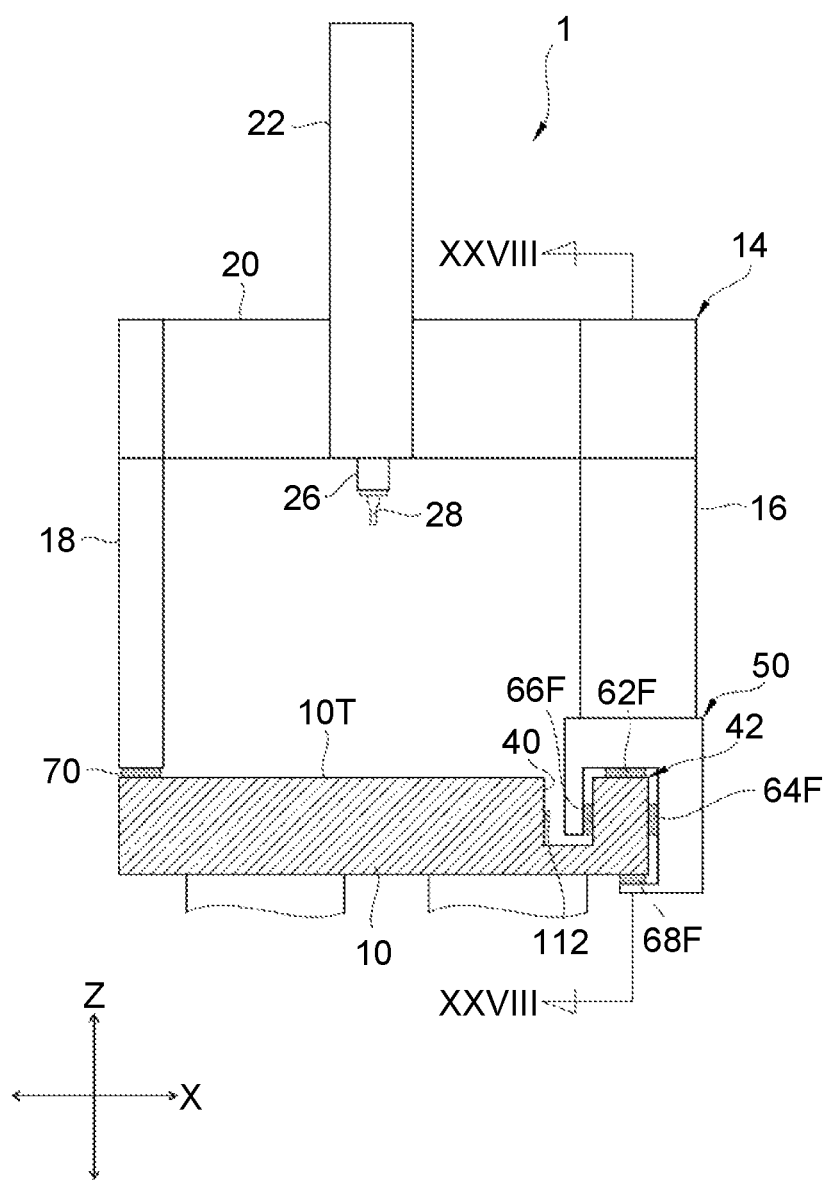
FIG. 27 is a front view (front schematic view) illustrating an appearance of a three-dimensional coordinate measurement apparatus 1 of the present embodiment.
Figure 28:
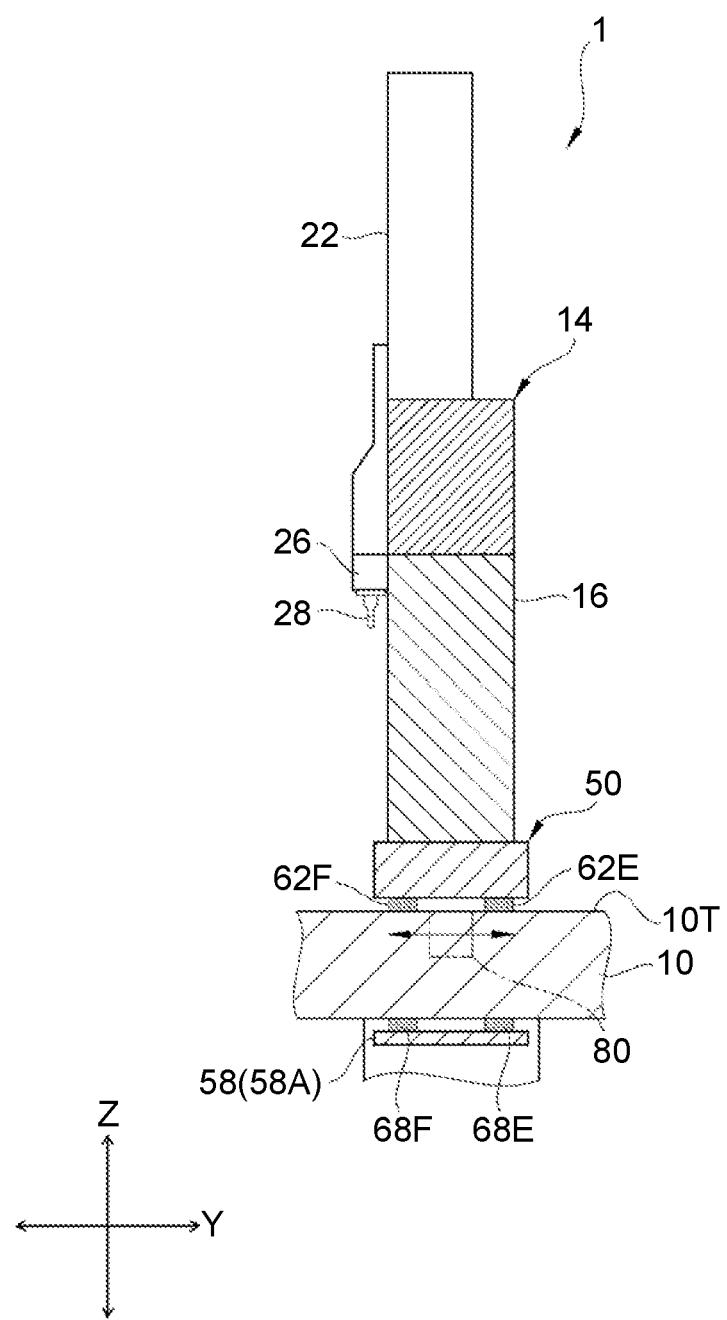
FIG. 28 is a sectional view (schematic sectional view) taken along a line XXVIII-XXVIII in FIG. 27.
Figure 29:
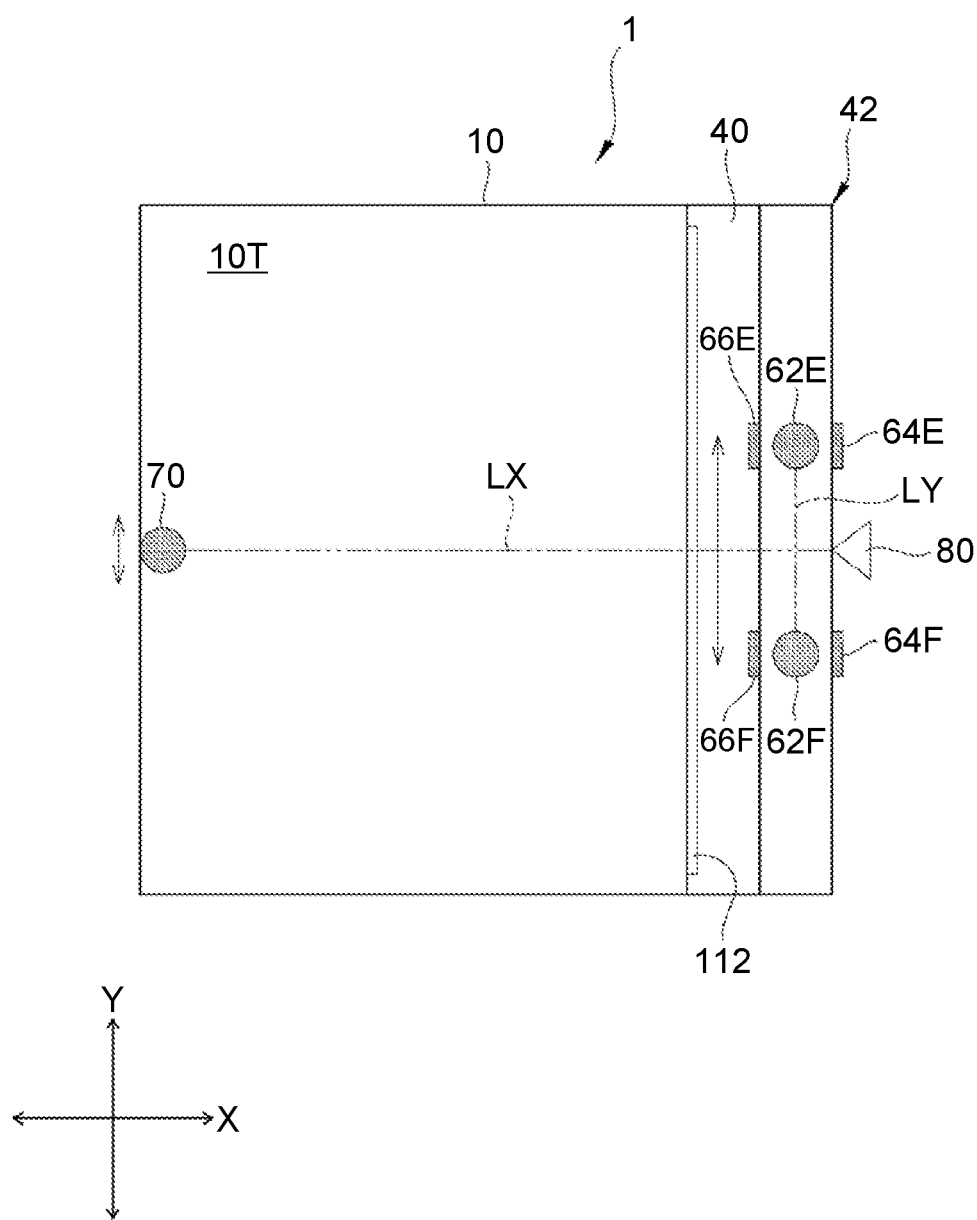
FIG. 29 is a top view illustrating a top surface of a surface plate and an arrangement of air pads and a driving unit provided in a Y carriage.

FIG. 27 is a front view (front schematic view) illustrating an appearance of the three-dimensional coordinate measurement apparatus 1 of the present embodiment. FIG. 28 is a sectional view (schematic sectional view) taken along a line XXVIII-XXVIII in FIG. 27. FIG. 29 is a top view illustrating the top surface 10T of the surface plate 10 and an arrangement of the air pads and the driving unit 80 provided in the Y carriage 14. In FIG. 28, a rectangular frame illustrated by a two-dot chain line shows a position of the driving unit 80.

As illustrated in FIGS. 27 to 29, the three-dimensional coordinate measurement apparatus 1 of the present embodiment has differences 1 to 4 described below from the comparative examples 1 to 3 described above.

As the difference 1, in the three-dimensional coordinate measurement apparatus 1 of the present embodiment, the right Y carriage 16 on the driving side is clearly distinguished from the left Y carriage 18 on the driven side that follows movement (following movement) of the right Y carriage 16 (bilaterally asymmetrical structure), and sliding friction of the left Y carriage 18 on the driven side is reduced as much as possible. Accordingly, when the Y carriage 14 is moved along the Y direction, oscillation around the Z-axis is reduced to enable the yawing error to be reduced.

As the difference 2, in the three-dimensional coordinate measurement apparatus 1 of the present embodiment, since rotation moment caused by drive of the driving unit 80 is applied to the Y carriage 14, the air pads are disposed up and down, left and right, and back and forth, on parts driven by the driving unit 80 so as to place (dispose) the driving unit 80 between the air pads. Accordingly, it is possible to reduce the pitching error and the rolling error that may worsen the yawing error.

That is, in the three-dimensional coordinate measurement apparatus 1 of the present embodiment, to reduce a yawing error, the right Y carriage 16 on the driving side is configured to clamp (hold, grip or pinch) the surface plate 10 (Y guide 42) vertically and horizontally. In addition, a group of the air pads 62E, 64E, 66E, and 68E, and a group of the air pads 62F, 64F, 66F, and 68F are respectively disposed back and forth in the Y direction of the driving unit 80 with the driving unit 80 disposed at the center between the air pads. The air pad 70 on the driven side is limitedly disposed only on the top surface side of the surface plate 10, and is disposed in the Y direction within a distance between each of the groups of the air pads disposed back and forth on the driving side.

Accordingly, sliding friction is concentrated on the driving side, and the driven side is only supported.

As illustrated in FIG. 29, the air pad 70 on the driven side may be positioned on a substantially opposite side of the surface plate 10 with respect to the driving unit 80 such that a line LX connecting between the air pad 70 on the driven side and the driving unit 80 is perpendicular to a line LY connecting between each of two pairs of air pads existing back and forth across the driving unit 80. From another viewpoint, it is preferable that the driving unit 80 is provided at an intermediate point between each of the two pairs of air pads on the driving side, and the air pad 70 is also at a point on the driven side corresponding to the intermediate point between each of the two pairs of air pads on the driving side.

As the difference 3, in the three-dimensional coordinate measurement apparatus 1 of the present embodiment, there is provided the driving unit 80 with the roller 84 that is brought into contact with the right side surface of the Y guide 42 (surface plate 10). This prevents a placement error of the driving unit 80, and prevents distortion due to a bimetallic effect from occurring in the driving unit 80, which is different from the comparative example 3. Thereby, measurement accuracy with reference to the surface plate 10 can be acquired.

As the difference 4, in the three-dimensional coordinate measurement apparatus 1 of the present embodiment, the scale 112 is provided on the left side surface 40L of the groove 40 to reduce a distance between the measurement region where a measuring object is disposed on the top surface 10T of the surface plate 10 and the scale 112. This enables to improve measurement accuracy.

Here, while the Y guide 42 is formed by the groove 40 formed in the top surface 10T of the surface plate 10 in each of the above embodiments, the Y guide may be formed in a different manner.

Figure 30:
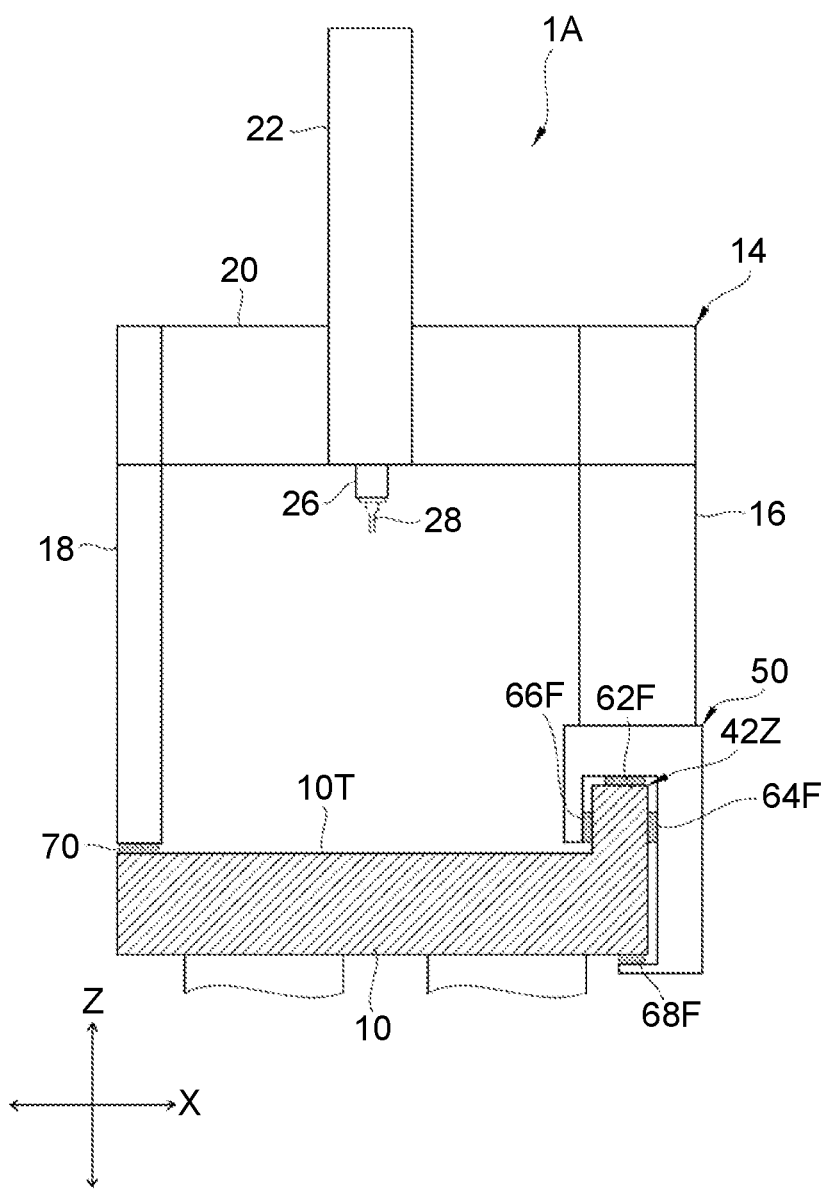
FIG. 30 is a front view (front schematic view) illustrating an appearance of a three-dimensional coordinate measurement apparatus of another embodiment.

FIG. 30 is a front schematic view of a three-dimensional coordinate measurement apparatus 1A of another embodiment which includes a Y guide 42Z different from the Y guide 42 of each of the above embodiments. As illustrated in FIG. 30, at a right end part of a top surface 10T of the surface plate 10 in FIG. 30 (an end part facing the right Y carriage 16), there is formed a projecting part that projects in the Z direction and extends in the Y-axis direction. The projecting part forms the Y guide 42Z that supports the right Y carriage 16 in a movable manner in the Y-axis direction. The three-dimensional coordinate measurement apparatus 1A has the essentially same structure as that of the three-dimensional coordinate measurement apparatus 1 of each of the above embodiments, except for including the Y guide 42Z.

As described above, the Y guide 42Z can be formed by the projecting part. When the Y guide 42Z is made of a material different from that of the surface plate 10, for example, the Y guide 42Z may be deformed due to a difference in thermal conductivity between the surface plate 10 and the Y guide 42Z. In addition, when the surface plate 10 is slightly warped, measurement with reference to the surface plate may not be performed. Thus, it is preferable that the Y guide 42 is formed by the groove 40 as described in each of the above embodiments.

REFERENCE SIGNS LIST

1 . . . three-dimensional coordinate measurement apparatus, 10 . . . surface plate, 10B, 20B, 42B, 202B . . . bottom surface, 10R, 24R, 40R, 42R, 250R . . . right side surface, 10T, 20T, 42T, 202T . . . top surface, 12 . . . mount base,

14 ... Y carriage, 16 ... right Y carriage, 18 ... left Y carriage, 20 ... X guide, 20E, 24E, 202E, 250E ... rear surface, 20F, 24F, 202F, 250F ... front surface, 22 ... Z column, 24 ... Z carriage, 24L, 40L, 42L, 250L ... left side surface, 26 ... measuring probe, 28 ... stylus, 40 ... groove, 40B ... bottom surface, 42 ... Y guide, 50, 200 ... support section, 52 ... base end, 54 ... right side part, 56 ... left side part, 58 ... tip, 58A ... support plate, 62E, 62F, 64E, 64F, 66E, 66F, 68E, 68F, 70, 210, 212, 214, 216, 260, 262, 264, 266 ... air pad, 80, 220, 270 ... driving unit, 82, 222, 272 ... motor, 84, 224, 274 ... roller, 110 ... linear encoder, 112 ... scale, 114 ... optical sensor, 130L ... left rail, 130R ... right rail, 132L, 132R ... guide groove, 134, 134E, 134F ... bellows cover, 150, 152 ... thermal insulation member, 202 ... X guide insertion hole, 250 ... Z carriage insertion hole.

What is claimed is:

1. A three-dimensional coordinate measurement apparatus comprising:
    a surface plate configured to place a measuring object; and
    a Y carriage configured to support a measuring probe, the Y carriage supported by two strut members which are across the surface plate and movable in a Y-axis direction of the surface plate,
    wherein the two strut members include a first strut member provided with a driving mechanism configured to drive the Y carriage in the Y-axis direction, and a second strut member configured to move following the first strut member,
    a guide portion parallel to the Y-axis direction is formed in the surface plate on a first strut member side,
    side surface support members which support the first strut member on the surface plate by holding both opposed side surfaces of the guide portion, are provided, and
    the side surface support members are arranged separately from each other along the Y axis direction with the driving mechanism interposed between the side surface support members.

2. The three-dimensional coordinate measurement apparatus according to claim 1,
    wherein the second strut member is supported only by a top surface of the surface plate, the top surface on which the measuring object is placed.

3. A three-dimensional coordinate measurement apparatus comprising:
    a surface plate configured to place a measuring object; and
    a Y carriage configured to support a measuring probe, the Y carriage supported by two strut members which are across the surface plate and movable in a Y-axis direction of the surface plate,
    wherein the two strut members include a first strut member provided with a driving mechanism configured to drive the Y carriage in the Y-axis direction, and a second strut member configured to move following the first strut member,
    a groove portion parallel to the Y-axis direction is formed in the surface plate on a first strut member side,
    side surface support members which support the first strut member on the surface plate by holding a side surface of the groove portion and a side surface of the surface plate on the first strut member side, are provided, and
    the side surface support members are arranged separately from each other along the Y axis direction with the driving mechanism interposed between the side surface support members.

* * * * *